United States Patent [19]
Kupiec

[11] Patent Number: 5,696,962
[45] Date of Patent: Dec. 9, 1997

[54] METHOD FOR COMPUTERIZED INFORMATION RETRIEVAL USING SHALLOW LINGUISTIC ANALYSIS

[75] Inventor: Julian M. Kupiec, Cupertino, Calif.

[73] Assignee: Xerox Corporation, Stamford, Conn.

[21] Appl. No.: 646,833

[22] Filed: May 8, 1996

Related U.S. Application Data

[63] Continuation of Ser. No. 85,446, Jun. 24, 1993, abandoned.

[51] Int. Cl.⁶ .................................................. G06F 17/30
[52] U.S. Cl. ......................... 395/604; 395/605; 395/759
[58] Field of Search ....................... 364/DIG. 1, DIG. 2, 364/419.04, 419.07, 419.08; 395/600, 604, 605, 759

[56] References Cited

U.S. PATENT DOCUMENTS

| | | | |
|---|---|---|---|
| 4,775,956 | 10/1988 | Kaji et al. | 364/900 |
| 4,941,124 | 7/1990 | Skinner, Jr. | 364/900 |
| 4,994,967 | 2/1991 | Asakawa | 364/419 |
| 5,197,005 | 3/1993 | Shwartz et al. | 364/419 |
| 5,263,167 | 11/1993 | Conner, Jr. et al. | 395/700 |
| 5,278,980 | 1/1994 | Pedersen et al. | 395/600 |
| 5,377,103 | 12/1994 | Lamberti et al. | 364/419.08 |
| 5,377,323 | 12/1994 | Vasudevan | 395/200 |
| 5,404,506 | 4/1995 | Fujisawa et al. | 395/600 |
| 5,418,948 | 5/1995 | Turtle | 395/600 |

FOREIGN PATENT DOCUMENTS

| | | | |
|---|---|---|---|
| 0157539 | 10/1985 | European Pat. Off. | G06F 15/40 |
| 0304191 | 2/1989 | European Pat. Off. | G06F 15/40 |

OTHER PUBLICATIONS

Jacobs, Paul S., et al. "Lexico-Semantic Pattern Matching as a Companion to Parsing in Text Understanding," Abstract-Artificial Intelligence Lab., GE R & D, Schenectady, NY pp. 337-341, No date.

Cutting, Doug, et al. "A Practical Part-of-Speech Tagger," Xerox Palo Alto Research Center, Palo Alto, California, USA, No Date.

Westlaw® User Guide pp. 1-24, No Date.

Hopcroft, John E., et al. "Introduction to Automata Theory, Languages, and Computation," Copyright ©1979 by Addison-Wesley Publishing Co. Inc.

Francis, W.Nelson, et al. "Frequency Analysis of English Usage," Houghton Mifflin Company—Boston, excerpts pp. 1–21 & 457–561, No Date.

Salton, G. et al. "Automatic Query Formulations in Information Retrieval," Journal of the American Society for Information Science. 34(4): pp. 262–280; 1983.

Miller, George A., et al. "Five Papers on WordNet™," CSL Report 43, Jul. 1990, Revised Mar. 1993.

Cutting, Doug, et al. "An Object-Oriented Architecture for Text Retrieval," Proc. of a Conf. Intelligent Text and Image Handling RIAO 91, Barcelona, Spain 2–5 Apr. 1991 pp. 285–298.

Galbiati, Giulia "A Phrase-Based Matching Function," Jour. of The Amer. Soc. For Information Scie. 42(1):36–48, Jan. 1991.

(List continued on next page.)

*Primary Examiner*—Thomas G. Black
*Assistant Examiner*—Maria N. Von Buhr
*Attorney, Agent, or Firm*—Alexander E. Silverman

[57] ABSTRACT

A computerized method for retrieving documents from a text corpus in response to a user-supplied natural language input string, e.g., a question. An input string is accepted and analyzed to detect phrases therein. A series of queries based on the detected phrases is automatically constructed through a sequence of successive broadening and narrowing operations designed to generate an optimal query or queries. The queries of the series are executed to retrieve documents, which are then ranked and made available for output to the user, a storage device, or further processing. In another aspect the method is implemented in the context of a larger two-phase method, of which the first phase comprises the method of the invention and the second phase of the method comprises answer extraction.

25 Claims, 4 Drawing Sheets

OTHER PUBLICATIONS

Frants, Valery I., et al. "Algorithm for Automatic Construction of Query Formulations in Boolean Form," Journal of the Ameri. Society for Information Science.42(1):16–26, Jan. 1991.

Gauch, Susan, et al. "Search Improvement via Automatic Query Reformulation," AMC Transactions on Information Systems, vol. 9, No. 3, Jul. 1991, pp. 249–280.

Salton, Gerard, et al. "Automatic Text Structuring and Retrieval–Experiments in Automatic Encyclopedia Searching," 14th Intl. ACM SIGIR Conf.Res. & Der.in Info.Retrival. Oct. '91.

Wendlandt, Edgar B., et al. "Incorporating a Semantic Analysis into a Document Retrieval Strategy," 14th Intl. ACM SIGIR Conf. Ref. & Der. of Info. Retrieval. Oct. 1991, pp. 270–279.

Kupiec, Julian "Robust part–of–speech tagging using a hidden Markov model," Computer Speech & Language, 1992:6.

Kupiec, Julian "Hidden Markov Estimation for Unrestricted Stochastic Context–Free Grammars," IEEE International Conf. on Acoustics, Speech & Signal Proc. Mar. 23–26, '92 pp. I–177–I–180.

Hearst, Marti A. "Automatic Acquisition of Hyponyms from Large Text Corpora," Proc. of Coling–92, Nantes, Aug. 23–28, '92 pp. 539–545.

Broglio, J. et al. "Query Processing For Retrieval From Large Text Bases," ARPA Human Lang.Tech. Workshop, Mar. '93 Plainsboro, N.J.

5,696,962

METHOD FOR COMPUTERIZED INFORMATION RETRIEVAL USING SHALLOW LINGUISTIC ANALYSIS

This is a continuation of application Ser. No. 08/085,446, filed Jun. 24, 1993.

COPYRIGHT NOTIFICATION

A portion of the disclosure of this patent document contains material which is subject to copyright protection. The copyright owners have no objection to the facsimile reproduction, by anyone, of the patent document or the patent disclosure, as it appears in the patent and trademark office patent file or records, but otherwise reserve all copyright rights whatsoever.

BACKGROUND OF THE INVENTION

The present invention relates to computerized information-retrieval (IR) systems and methods, and more particularly to computerized information-retrieval systems and methods used with textual databases.

In prior art IR systems and methods the user often has to proceed iteratively, usually using a special query language, by beginning with an initial query, scanning the results of that query (that is, the documents that were retrieved in response to that query), modifying the query if the results were unsatisfactory, and repeating these steps until satisfactory results are obtained. The user is responsible for modifying or refining the query and typically receives little or no help from the system in query construction or refinement.

Prior art systems cannot locate or highlight phrases within documents if the phrases are not found in the input query. For example, in response to a user query regarding what film pits Humphrey Bogart against gangsters in the Florida Keys, prior art IR systems would accept from the user a query containing words such as "film," "Bogart," "gangster," and "Florida Keys," and would search for the co-occurrence of these words within single documents. It would be left to the user to piece together the various documents thus retrieved to determine the correct answer.

Attempts have been made in the prior art to allow users to formulate queries in natural language. One such attempt is found in systems called question-answering systems. A question-answering system can respond to certain natural-language queries, but only because the data in its database are heavily preprocessed to accommodate such queries. For example, a question-answering system designed to respond to user queries about moon rocks will typically employ a database configured as a two-dimensional array, with moon-rock sample numbers arrayed along one dimension and fact categories, such as ore content of the rocks, arrayed along the other axis. The system responds to user queries simply by accessing the appropriate cell of the array.

Prior art IR systems and methods do not automatically perform a sequence of queries designed to include the optimal query or queries needed to answer a user's natural-language question. Furthermore, prior art IR systems and methods neither guess at the answer to the user's question nor attempt to manipulate or process queries based on such a guess. They simply match text.

SUMMARY OF THE INVENTION

The present invention provides a method for computerized information retrieval from a text corpus in response to a natural-language input string, e.g., a question, supplied by a user. A string is accepted as input and analyzed to detect noun phrases and other grammatical constructs therein. The analyzed input string is converted into a series of Boolean queries based on the phrases thus detected. A series of queries based on the detected phrases is automatically constructed through a sequence of successive broadening and narrowing operations designed to generate an optimal query or queries. The queries of the series are executed to retrieve documents, which are then ranked, for example in order of probable relevance to the question. The ranked documents can then, for example, be presented to the user, saved to a storage device, or made available for further processing.

In another aspect the present invention is used in the context of a larger, two-phase method for information retrieval in response to a user-supplied natural-language input string such as a question. The first phase comprises the method of the present invention, which is used to retrieve a set of documents likely to be relevant from a text corpus. The second phase comprises answer extraction, in which documents retrieved in the first phase are analyzed to generate answer hypotheses that are likely to be the answer to the question and the document or documents most likely to contain the answer to the user question are selected and pointed out to the user.

A further understanding of the nature and advantages of the present invention may be realized by reference to the remaining portions of the specification and the drawings.

DESCRIPTION OF SPECIFIC EMBODIMENTS

Figure 1:
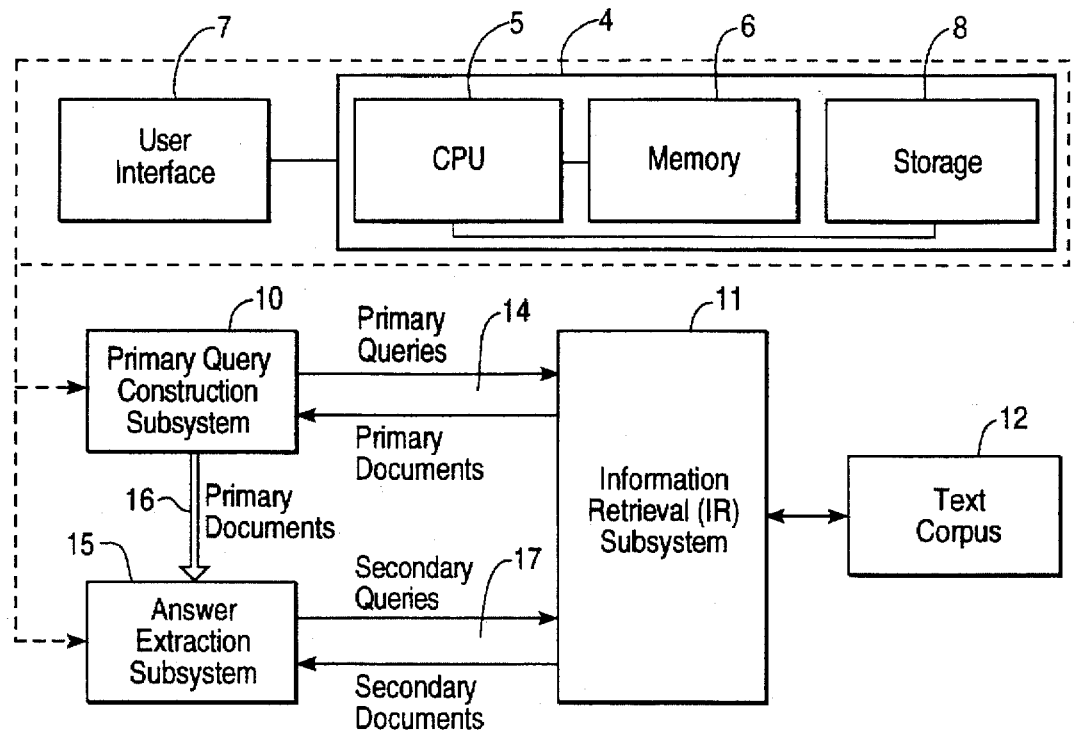
FIG. 1 illustrates a system suitable for an embodiment of the present invention.

The disclosures in this application of all articles and references, including patent documents, are incorporated herein by reference.

The description that follows is in four parts. Part I is an introduction that includes an overview of the invention and a glossary of terms. Part II describes the method of the present invention in one embodiment. Part III describes MURAX, a system designed to embody the method of the present invention in the context of a larger two-phase method of which the method of the present invention is used to carry out the first phase. Part IV concludes the description.

Part I. Introduction

1. Overview of the Invention

The present invention provides a method for primary query construction. A system operating according to this method accepts a natural-language input string such as a user-supplied question and produces a set of documents that are likely to be relevant—that is, document that are likely to contain the answer to the question. The method includes analysis of the input string to detect phrases therein, and automatic query construction and reformulation in which a series of IR queries is carried out to retrieve documents. The documents that are retrieved can be ranked in order of probable relevance. The method is designed to provide robust performance and computational efficiency.

The method of the present invention can be used by itself or in a larger context. In particular, it can be used in a two-phase method that accepts a user's question in natural-language form and responds by not only producing relevant documents, but by also generating answer hypotheses and finding these hypotheses within the documents. Such a two-phase method comprises a first phase of primary query construction according to the method of the invention and a second phase of answer extraction applied to the documents retrieved during the first phase. In a preferred embodiment the second phase is performed according to the method of the co-pending application entitled METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION, U.S. patent application Ser. No. 08/082,938 now U.S. Pat. No. 5,519,608, which is by the same inventor as the subject application, and is filed concurrently with the subject application now U.S. Pat. No. 5,519,608, issued May 21, 1996.

2. Glossary

The following terms are intended to have the following general meanings:

Answer: The actual, correct answer to a given question.

Answer hypothesis: A guess at the correct answer to a question, produced by the invention.

Apposition: A grammatical construction in which two (usually adjacent) noun phrases refer to the same thing.

Co-occurrence queries: A secondary query that contains phrases, other than the type phrase, from a user's question.

Corpus, corpora: A body of natural language text to be searched, used by the invention.

Degree of mismatch: A quantified measure of similarity between two phrases.

Document match: The situation where a document satisfies a query.

Domain: A broad area that characterizes an information retrieval task, e.g., general knowledge, medicine, etc.

FSM, finite-state recognizers: A device that receives a string of symbols as input, computes for a finite number of steps, and halts in some configuration signifying that the input has been accepted or else that it has been rejected.

Head noun: The main noun in a noun phrase which may be modified by other words in the phrase. In English, the head noun is usually the rightmost word in the noun phrase.

Indexing: The association of a word with all the different places the word exists in a corpus.

Information retrieval, IR: The accessing and retrieval of stored information, typically from a computer database.

IS-A: The name of a particular lexico-syntactic pattern and linguistic relation. The IS-A relation uses forms of the verb "to be" to denote or assert the identity of or a characteristic of an object. An example of the IS-A relation is seen in the sentence "Brooklyn is a borough of New York City."

Language modeling: Computational modeling of natural language.

Lexico-syntactic: Having to do with words, syntactic patterns, or both. Lexico-syntactic analysis is used in the invention to verify linguistic relations.

List inclusion: The name of a particular lexico-syntactic pattern in which a noun is included in a list of related nouns. Each member of the list has the same relationship as other members of the list to a (primary) noun outside the list. Typically the nouns of the list indicate objects of the same type, and are separated within the list by commas or semicolons.

Match sentences: Sentences in a document that cause or help cause the document to be retrieved in response to a query. Match sentences contain phrases that conform to the search terms and constraints specified in the query.

Noun phrase: A phrase consisting of a noun, its modifiers (e.g., adjectives and other nouns) and possibly an article.

Noun phrase inclusion: The name of a particular lexico-syntactic pattern.

Operators: kleene-plus, sequence, optionality, union: Functions in the finite-state calculus, used in finite-state recognizers. Optionality means 0 or more instances.

Phrase matching: Finding phrases that satisfy a lexico-syntactic pattern or other linguistic pattern.

Predicate/argument match: Matching a particular lexico-syntactic pattern that represents argument structure. The pattern relates a verb and one or more associated nouns.

Primary documents: Documents from a text corpus that are retrieved in response to a primary query.

Primary query: A query that is based only on phrases from the user's question.

Query: An expression involving words, Boolean operators and proximity constraints that is used by an information retrieval system to search a corpus and return text that matches the expression.

Question: A user's information need, presented to the invention as a natural language question.

Regular expression: A specification of functions in the finite-state calculus.

Relation; phrase relation: A linguistic relation between words or phrases, or between a word or phrase and a certain property (e.g., the property of being a person's name). Put another way, a relation is the way that words work together to create meaning in a phrase or that phrases work together to create meaning in a sentence. A relation has syntactic, semantic, contextual and other aspects. For example, in the sentence, "George Washington was the first president," a relation exists between the phrases "first president" and "George Washington." The syntactic aspects of a relation are used to approximate the relation in some embodiments of the invention.

Scoring: The assignment of values to answer hypotheses, reflecting their likelihood as being the correct answer.

Secondary documents: Documents from a text corpus that are retrieved in response to a secondary query.

Secondary query: A query that is based on an answer hypothesis and that additionally may be based on other phrases.

Shallow syntactic analysis: A syntactic analysis of a phrase that represents gross grammatical structure and not necessarily all the details of the linguistic relationships in the phrase.

Simple noun phrase: A noun phrase that does not contain prepositional phrases or conjunctions.

Tagging: The assignment of part-of-speech categories to words.

Title phrase: A phrase that represents a title (e.g., of a book, film, etc.), which may or may not be a noun phrase, and which typically is indicated typographically (e.g., by enclosing quotes, capital letters, italics, etc.), Type phrase: A phrase in a question that indicates the nature of the answer, e.g., "What river . . . " A type phrase can be used to help develop answer hypotheses, because it provides an indication of what the answer should look like. For example, in the question, "Who was the first President of the United States?", the phrase "the first President of the United States" is the type phrase. As another example, in the question, "What river does the Hoover Dam dam?" the type phrase is "river."

Verify, verification: The process of determining whether a relation exists. When a phrase match is verified, this evidence that the relation holds; that is, text has been found in the corpus that supports the existence of the relation.

Part II. An Embodiment of the Method

1. Organization of Part II

Part II of the description sets forth the method of the present invention in one embodiment. Section 2 provides an overview of a system suitable to implement the method. Section 3 outlines the major, high-level steps of the method. Sections 4, 5, and 6 provide detailed breakdowns of three of these high-level steps: question processing, automatic query construction and reformulation, and results ranking. Section 7 describes some variations of the method.

2. System Overview

FIG. 1 illustrates a system suitable to implement the method of the present invention. A user's natural-language question is fed to a primary query construction subsystem 10 whose software operates on supporting hardware comprising a computing node 4 further comprising a processor 5 and memory 6 coupled to the processor 5. In some embodiments computing node 4 additionally comprises a storage device 8 coupled to processor 5. Primary query construction subsystem 10 is coupled via channel 14 to an information retrieval subsystem 11 that operates on a text corpus 12. In response to questions input by the user to the primary query construction subsystem at a user interface 7, primary query construction subsystem 10 sends primary queries to information retrieval subsystem 11. In response to these queries information retrieval subsystem 11 retrieves documents or document identifiers from text corpus 12 and sends these back to primary query construction subsystem 10.

Optionally, as further illustrated in FIG. 1, the method of the current invention can be embodied in a system suitable to the two-phase method for answering a natural-language question. Answer extraction subsystem 15 is coupled with primary query construction subsystem 10 via channel 16 and with information retrieval subsystem 11 via channel 17. Answer extraction subsystem 15 receives the output of primary query construction subsystem 10 as its input. Answer extraction subsystem 15 sends queries, including but not limited to secondary queries, to information retrieval subsystem 11, which sends back documents or document identifiers retrieved from text corpus 12. Answer extraction subsystem 15 runs on supporting hardware that can comprise node 4 further comprising processor 5 and memory 6 or, alternatively, a separate node comprising its own processor and memory (not shown). The output of answer extraction subsystem 15 is presented to the user via user interface 7.

In embodiments that do not include an answer extraction subsystem, the output of primary query construction can be presented to the user via user interface 7, or, alternatively, stored for later use in optional storage device 8.

Certain elements of the system of FIG. 1 will now be described in greater detail.

Primary query construction subsystem (10).

The primary query construction subsystem is a process that executes on one or more computing nodes. By "process" is meant a software entity that comprises one or more threads of execution and possibly one or more input/output streams. By "node" is meant a computer comprising memory and one or more processors. In FIG. 1, primary query construction subsystem 10 executes on a computing node 4 that comprises processor 5 and memory 6.

Computing node, processor, memory, user interface, and optional storage device (4, 5, 6, 7, 8).

The processor 5 and the memory 6 to which it is coupled form the core of a computing node 4 that executes the process that is primary query construction subsystem 10. The computing node 4 can in some embodiments further comprise a storage device 8, such as a hard disk, coupled to the processor 5. The user interface 7 comprises hardware, such as an input keyboard and display screen, and associated software to permit a user to communicate with the primary query construction subsystem. In some embodiments, for example if computing node 4 is a workstation, processor 5, memory 6, user interface 7, and (if present) storage device 8 are integrated into a single computer. In other embodiments, the user interface can run on a processor other than processor 5, or can be implemented on hardware that is at a location remote from processor 5 and memory 6. Persons of skill in the art will appreciate that a vast range of hardware and software can be used to implement node 4, processor 5, memory 6, user interface 7, and optional storage device 8 within the scope of the present invention.

Information retrieval subsystem (11).

The IR subsystem is a process that executes on one or more computing nodes (not shown). Typically the IR subsystem executes on a node or nodes distinct from the node or nodes on which the primary query construction subsystem executes, but this need not be the case. As described more fully below, the IR subsystem is capable of responding to certain primitive Boolean queries with proximity and order constraints, as well as to compound queries formed of these primitives. The IR subsystem 11 is coupled to the text corpus 12 in such a way that the IR subsystem 11, acting in response to an input query, can search the text corpus 12 for documents that match the query.

Text Corpus (12).

The method of the present invention is to be used in conjunction with a text corpus, which is a corpus (body) of information stored in the form of natural language text. Typically the corpus is a collection of articles or documents. Without limitation, kinds of corpora suitable to the invention include, for example, an encyclopedia, a collection of newspaper articles, a set of office correspondence, a set of files containing facts about clients or companies, or a collections of abstracts or articles from scientific or technical journals.

Typically the corpus 12 is stored as a computerized database. The computerized database can be implemented on any suitable hardware; typically such hardware comprises one or more mass storage devices such as hard disks or CD-ROMs.

Channels (14, 16, 17).

In a system suitable to the method of the present invention the various processes communicate with one another through communications channels. For example, in FIG. 1, primary query construction subsystem 10 communicates with IR subsystem 11 through channel 14. Where two communicating processes execute on a single node, the communications channels comprise interprocess communication links that also execute on the node. Where two communicating processes execute on different nodes, the communications channel comprises hardware links and software protocols through which the processes can communicate with one another. The communications channels can, for example, be implemented in a local area network or a wide area network and can, for example, incorporate wire, coaxial cable, fiber optic, or wireless hardware links. In one embodiment primary query construction subsystem 10 executes on a workstation at a user's location, IR subsystem 11 executes on a mainframe or server at a remote location (where text corpus 12 is also located), and communications channel 14 comprises a modem link across a wide area network.

It will be appreciated that in some embodiments two or more of the processes described above can be integrated into a single process as modules of that process. For example, the primary query construction subsystem and IR subsystem can be implemented as modules of a single process in some embodiments, or the primary query construction subsystem and an answer extraction subsystem can be implemented as modules of a single process in some embodiments. In such cases the communications channels between the modules can be, for example, shared variables or function or subroutine parameters.

3. Major Steps of the Method

Figure 2:
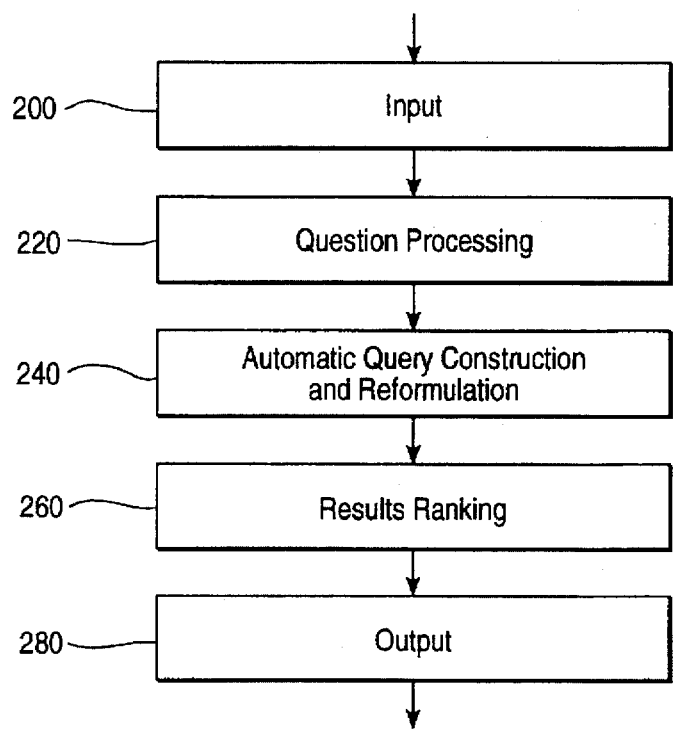
FIG. 2 is a high-level flow chart diagramming the method of the present invention.

Considered at a high level of abstraction, the method of the present invention proceeds in five major steps, as shown in the flowchart of FIG. 2: (1) input (step 200); (2) question processing (step 220); (3) automatic query construction and reformulation (step 240); (4) results ranking (step 260); and (5) results output (step 280). This section of the description explains how these steps work together in the context of the method as a whole. Subsequent sections examine the steps of question processing, automatic query construction and reformulation, and results ranking in greater detail. Still further details of these steps as embodied in the MURAX system are presented in Part III.

Note that in what follows, automatic query construction and reformulation will sometimes be called "query reformulation" for brevity's sake.

In step 200 the user inputs a character string to the primary query construction subsystem via the subsystem's associated user interface. The input character string represents a sequence of one or more natural language words. Typically the input string is in the form of a natural language question. However, this is not always the case; for example, an input string can be a statement, a paragraph, or even an entire article or other document.

In step 220 the primary query construction subsystem performs question processing on the input string. In one embodiment question processing comprises determining what part of speech each word of the input string is, recognizing noun phrases and title phrases in the input string, and extracting main verbs from the input string. Step 220 is analyzed in more detail in section 4 below. The result of step 220 is an analysis of the input string.

In step 240 the primary query construction subsystem, in conjunction with the information retrieval subsystem and its associated text corpus, performs automatic query construction and reformulation using the input string analysis developed in step 220. In one embodiment query reformulation comprises the construction and execution of two series of queries. Queries of the first series are typically simple queries, each such query being based on one of the noun phrases or title phrases detected during input string analysis. Queries of the second series are typically compound queries that comprise the simple queries as components. Query reformulation is described in greater detail in section 5 below. The result of step 240 is an unranked set of documents or document identifiers.

In step 260 the set of documents or document identifiers developed in step 240 is ranked according to a ranking scheme. The goal of this step is to rank highest the documents that are most relevant to the user's question. The primary query construction subsystem performs the ranking using the results of steps 220 and 240. In some embodiments step 260 can also involve user input via the user interface. Details of step 260 are presented in section 6 below. The result of step 260 is typically an ordered list of relevant documents.

In step 280 the primary query construction subsystem outputs the ordered list of relevant documents produced in step 260. The ordered list can be output directly to the user via the user interface. Alternatively or additionally it can stored in a storage device for later use, or sent to another process such as answer extraction that can use it as input. In some embodiments significant search terms can be highlighted in the relevant documents for ease of reference. In some embodiments output to the user can be done in an interactive fashion, for example, by permitting the user to issue commands to the system to display only document titles, to display complete documents, to display excerpts of documents, etc.

4. Question Processing

This section examines step 220, question processing, in detail. Question processing comprises shallow linguistic analysis of the natural language input string, which is typically (but not necessarily) in the form of a question.

Figure 3:
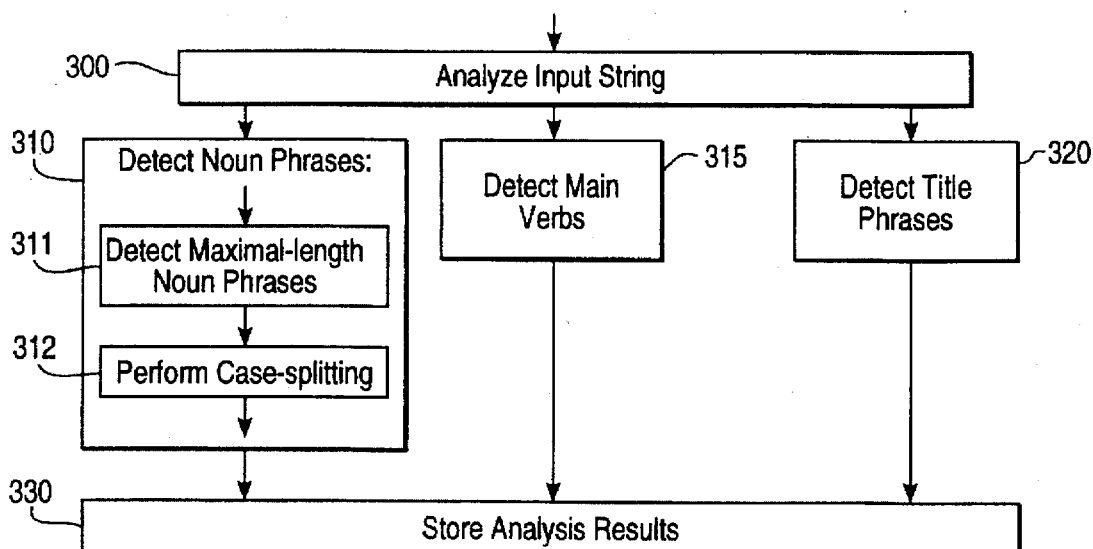
FIG. 3 flowcharts the component steps of question processing in one embodiment of the method.

FIG. 3 flowcharts the component steps of question processing in one embodiment of the method. In step 300 the input string is analyzed to determine what part of speech each word of the string is. Each word of the string is tagged to indicate whether it is a noun, verb, adjective, etc. Tagging can be accomplished, for example, by a tagger that uses a hidden Markov model. The result produced by step 300 is a tagged input string.

After step 300 is complete, steps 310, 315, and 320 are performed either in series or, as illustrated in FIG. 3, in parallel. In step 310, which comprises component steps 311 and 312, the tagged input string is analyzed to detect noun phrases. In step 315 the tagged input string is further analyzed to detect main verbs. In step 320 the input string is analyzed to detect title phrases. Each of steps 310, 315, and 320 will now be further described.

In step 310 noun phrases are detected. A noun phrase is a word sequences that consists of a noun, its modifiers such as adjectives and other nouns, and possibly a definite or indefinite article. Step 310 comprises steps 311 and 312. In step 311 the tagged input string is analyzed to detect the maximal-length simple noun phrases that it contains. This can be done, for example, using a finite state machine (FSM) noun phrase recognizer. See J. E. Hopcroft and J. D. Ullman, *Introduction to Automata Theory, Languages, and Computation* (Addison-Wesley, 1979). In step 312 case-splitting is performed wherein maximal length noun phrases detected in step 311 can be split into short noun phrases according to initial word capitalization. In particular, a sequence of words within a noun phrase that is itself a noun phrase and whose words all have their first letters capitalized is split from other words in the noun phrase. For example, if in step 311 the noun phrase "New York City borough" is detected, then in step 312 it can be split as New York City | borough because the initial letters of the words of "New York City" are capitalized while the initial letter of "borough" is not. Once this split is determined, for purposes of further processing the noun phrase "New York City borough" is discarded and is replaced by the two shorter noun phrases "New York City" and "borough." As another example, if in step 311 the noun phrase "last Apache warrior chief" is detected, then in step 312 this phrase is split according to its initial capitalization as last | Apache | warrior chief and the noun phrases "Apache" and "warrior chief" are used in further processing while the original noun phrase "last Apache warrior chief" is discarded. The adjective "last," which after the splitting is no longer part of a noun phrase, is likewise discarded.

In step 315 main verbs are detected. Main verbs are any words that are tagged in step 300 as verbs and that are not auxiliary verbs. Typically there is one main verb in the input string, but there can also be none, or two or more.

In step 320 title phrases are found in the input string. Title phrases are word sequences that represent titles of books, motion pictures, or other works. They can in some cases include or even be the same as noun phrases detected in step 310. In other cases they can include verbs or other parts of speech that are not noun phrase components. Title phrases can be recognized, for example, according to typographical indications such as being enclosed in quotation marks or typeset in italics. Thus the following input string fragments would be recognized as title phrases:

"Gone With the Wind"

*Gone With the Wind*

Typically the input string contains zero or one title phrases, but it is also possible for it to contain two or more.

In step 330 the results of steps 310, 315, and 320 are stored. The stored results represent the completed analysis of the input string. The results can be stored, for example, in a list of 3-tuples, one 3-tuple for each noun phrase, main verb, and title phrase detected during steps 310, 315, and 320. Each 3-tuple is an ordered list of the form (i, phrase-type, text), where i is a unique index number associated with the phrase, such as its position (fits position (first, second, third . . . ) in the list; phrase-type indicates the type of phrase (noun phrase, main verb, or title phrase); and text is a string that contains the text of the phrase itself. Thus for example if the noun phrases "Abraham Lincoln" and "theater," the main verb "shoot," and the title phrase "Reconsidering the Civil War" are detected in the input string, the list of results, expressed here in Lisp syntax, can be of the form ((1 'NP "Abraham Lincoln")(2 'NP "theater")

(3 'V "shoot")(4 'TP "Reconsidering the Civil War"))

The list can be stored in the processor's memory. Alternatively or additionally it can be stored in a storage device coupled to the processor. It will be appreciated that although step 330 is illustrated in FIG. 3 as a step that is performed separately from and subsequently to steps 310, 315, and 320, in some embodiments an empty list is created as part of step 330 at the outset, prior to the execution of steps 310, 315, and 320, and thereafter is filled in incrementally during the processing of the steps 310, 315, and 320, so that upon completion of steps 310, 315, and 320, step 330 is effectively completed as well.

5. Query Reformulation

This section examines step 240, automatic query construction and reformulation, in detail. Automatic query construction and reformulation, or query reformulation for short, comprises generating and executing a sequence or series of IR queries to obtain a manageable (e.g., relatively small) set of relevant documents or document identifiers. The IR queries are based on the analysis of the input string, certain constraints set by the user or by default, and intermediate results obtained during the series of queries itself.

This section comprises several subsections. Subsection 5.1 describes a query syntax that will be used to explain the kinds of queries made in the course of executing the method of the present invention. Subsection 5.2 describes how queries are executed. Subsection 5.3 describes the concepts of broadening and narrowing. Subsection 5.4 provides an overview of the steps of query reformulation, and subsections 5.5 through 5.10 provide a more detailed explanation of these steps.

5.1 Query Syntax

Unlike the input string, which is formulated in natural language, IR queries are formulated in a query language that expresses Boolean, proximity, and ordering or sequence relationships between search terms in a form understandable by the IR subsystem. For purposes of discussion the query language is represented as follows:

| | |
|---|---|
| term | represents the single search term term. A term can be an individual word or in some cases another query. |
| <term1 term2 . . . > | represents strict ordering of terms. The IR subsystem determines that a document matches this query if and only if all the terms enclosed in the angle brackets appear in the document within a sequence containing a maximum of p intervening words between the first and last words of the sequence (that is, a sequence of at most p+2 words) and in the exact order in which they appear in the brackets. The query <0 phrase> matches only the exact wording of phrase phrase. Strict ordering queries can be nested as in, for example, the query<br>   <5 <0 Abraham Lincoln> president> |
| (p term1 term2 . . . ) | represents terms within a proximity of p words from one another, with no strict ordering imposed. The IR subsystem determines that a document matches this query if and only if all the terms enclosed. in parentheses appear in the document within a sequence containing a maximum of p intervening words. For example, the query<br>   (3 big white ball)<br>matches a document containing a sentence that begins "Taking up the white ball, with the big bat in its hands, the gorilla began to play baseball . . . " because the sequence that begins with the first term matched ("white") and ends with the last term matched ("big") has no more than 3 intervening words between the first and last words of the sequence. The order of the terms within the sequence is not considered for this query. Proximity queries can be nested and can also contain strict |

-continued

| | |
|---|---|
| | ordering queries as in, for example, the query<br>(20 <0 Abraham Lincoln><br>(10 slavery freedom)) |
| [term1 term2 ... ] | represents a Boolean logical AND of terms. The IR subsystem determines that a document matches this query if and only if each of the terms within the square brackets occurs at least once in the document. AND queries can include proximity queries or strict ordering queries, as in, for example, the query<br>[<0 Abraham Lincoln><br>(10 slavery freedom)] |

5.2 Query Execution

Figure 4:
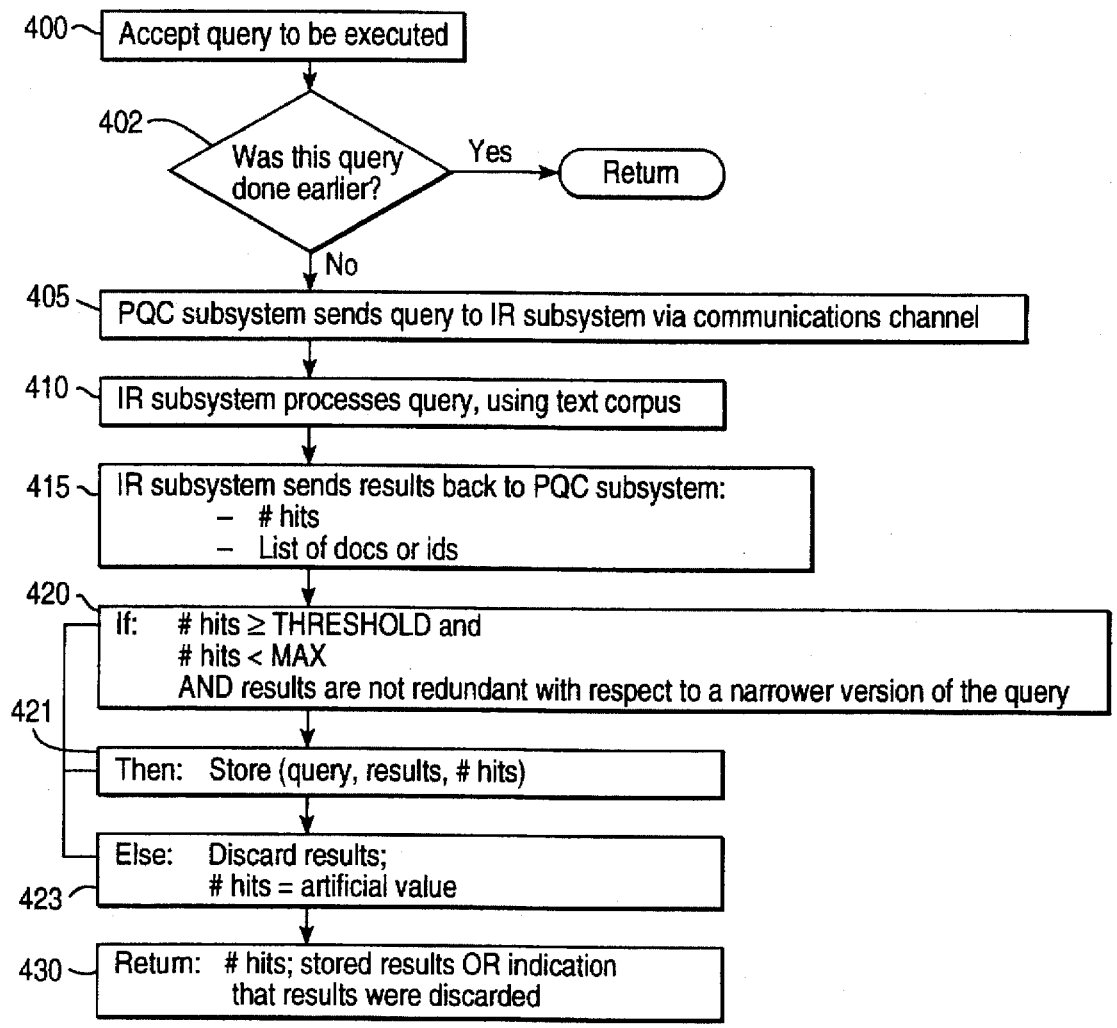
FIG. 4 flowcharts the steps of query execution in one embodiment of the method.

Executing a query, whether an initial query or one of the other queries to be described below, comprises a number of component steps, as illustrated for one embodiment of the invention in the flowchart of FIG. 4. In this embodiment query execution is carried out by a function called MAKE-QUERY. In step 400 MAKE-QUERY accepts as input the query to be executed. In step 402, the query is compared to any results previously stored by MAKE-QUERY to determine whether it has previously been executed. If the query has already been executed, MAKE-QUERY returns immediately; otherwise MAKE-QUERY continues with step 405.

In step 405 MAKE-QUERY sends the query from the primary query construction subsystem to the IR subsystem via a channel that connects these subsystems. In step 410 the IR subsystem performs the query in conjunction with the text corpus to determine "hits," that is, documents that match the query. In step 415 the IR subsystem sends the results of this processing back to the primary query construction subsystem via a channel. The results comprise the number of hits found plus a list of the retrieved documents or of identifiers, such as names or index numbers, for these documents.

In step 420 MAKE-QUERY determines whether to store the returned results. More specifically, in step 420, MAKE-QUERY determines whether the number of hits is greater than or equal to a threshold value such as 1, and less than a maximum value such as 50. The threshold and maximum values are typically specified by default (e.g., by the programmer) ahead of time. They also can be set by the user in some embodiments or dynamically by the primary query construction subsystem in some embodiments. The exact values chosen will depend on a number of factors, including without limitation the particular task to which the method of the invention is applied, the size of the text corpus, the amount of information the user wishes to see, and so forth. Furthermore, also in step 420 MAKE-QUERY checks to see whether the current query is a broadened version of a previous query (see below), and if so, whether the query has returned the same number of hits as that previous query. If so, the results are deemed redundant and so will not be stored.

Depending on the outcome of step 420, either step 421 or step 423 is executed. If in step 420 the number of hits is determined to be within the range established by the threshold and maximum values and the results are not deemed redundant, step 421 is executed. In step 421 the list of documents or document identifiers sent back by the IR subsystem is stored in association with the input query and the number of hits. If in step 420 the number of hits is determined to be less than the threshold value or greater than or equal to the maximum value, or the results are deemed redundant, then step 423 is executed. In step 423 MAKE-QUERY discards the results returned by the IR subsystem, and resets the number of hits to an artificial value. The artificial value is 0 if the number of hits detected by the IR subsystem was less than the threshold or if MAKE-QUERY deemed the results to be redundant, and is the maximum value if the number of hits was greater than or equal to the maximum value.

After step 421 or step 423 is complete execution proceeds at step 430. In step 430, MAKE-QUERY returns the number of hits along with any results stored in step 421, or, if step 423 was executed, an indication that the results were discarded. If step 423 was executed then number of hits that MAKE-QUERY returns step 430 is the artificial value set in step 423.

5.3 Broadening and Narrowing

A word on broadening and narrowing is helpful at this point. A "broad" query is one that generates relatively many hits (that is, document matches) when executed. It is so called because it represents a relatively broad scope of search by the IR subsystem. A "narrow" query is one that generates relatively few hits when executed. It is so called because it represents a relatively narrow scope of IR search.

"Broadening" means the formulation of a new query from an existing query in such a manner that the new query is broader than—that is, tends to generate more hits than-the existing query. "Narrowing" means the formulation of a new query from an existing query in such a manner that the new query tends to generate fewer hits than the existing query.

Broadening can be achieved, for example, by relaxing proximity constraints in the existing query or by deleting words or component queries from the existing query in order to formulate the new query. Narrowing can be achieved, for example, by tightening proximity constraints in the existing query or by adding words or component queries to the existing query in order to formulate the new query.

5.4 Overview of Query Reformulation

Figure 5:
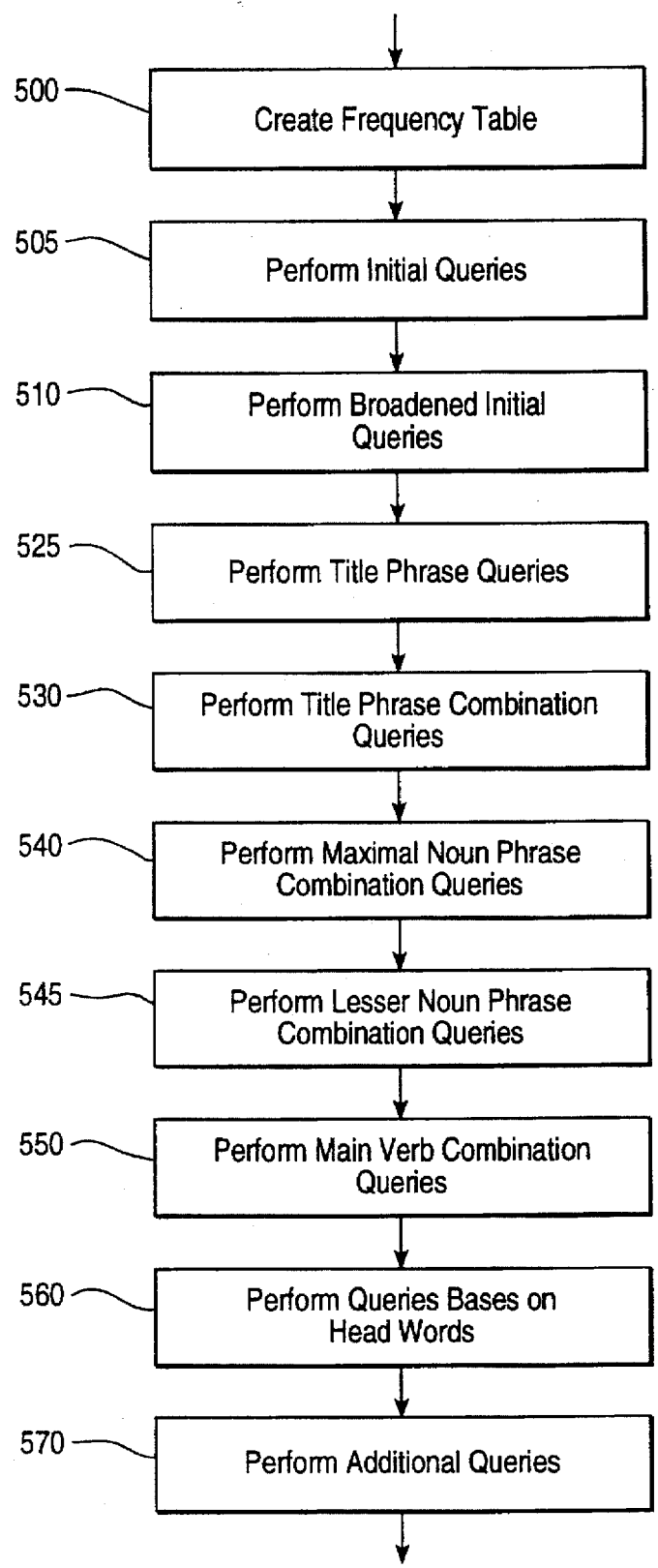
FIG. 5 flowcharts the component steps of automatic query construction and reformulation in one embodiment of the method.

FIG. 5 flowcharts the component steps of automatic query construction and reformulation in one embodiment of the method. In step 500 a table for tallying information about certain queries is created. In steps 505 through 570 a sequence of queries is performed automatically by the system with little or no user intervention. These queries are based on the completed analysis of the input string as stored in step 330.

Steps 505, 510, and 525 concern simple queries, which are queries based on individual noun phrases or title phrases. In step 505 initial queries are constructed and executed based on noun phrases in the input string. In step 510 broadened versions of these initial queries can be constructed and executed. In step 525 simple queries based on title phrases are constructed and executed.

Steps 530, 540, 545, 550, 560, and 570 primarily concern compound queries, which are queries comprising two or more components, each component being a simple query or another search term such as a verb. In step 530 queries based on combinations of title phrases and noun phrases are constructed and executed. In step 540 queries based on maximal combinations of noun phrases are constructed and executed. In step 545 additional queries based on lesser combinations of noun phrases are constructed and executed. In step 550 queries based on main verbs in conjunction with title phrases or noun phrases are constructed and executed. In step 560 queries based on head words of noun phrases can be constructed and executed. In step 570 still further queries, such as queries based on synonyms or hyponyms of words in noun phrases, can be constructed and executed.

Each of the steps of FIG. 5 will now be more fully described.

5.5 Frequency Table

In step 500 a table is created for tallying information about certain of the queries that will be created and processed in subsequent steps. This table is called the noun phrase frequency table, or simply the frequency table. The frequency table is empty at its creation and is filled in as later steps are executed. The frequency table can be stored in the processor's memory. Alternatively or additionally it can be stored in a storage device coupled to the processor. The frequency table can be represented as an array, a list of 3-tuples, or any other suitable data structure.

In one embodiment the frequency table is represented as a two-dimensional, 3-rows-by-n-columns array, where n is the number of noun phrases detected in the input string. Each column of the array is associated with exactly one of the n noun phrases and represents a 3-tuple containing the elements (i, number-of-hits, proximity). Here i is the unique index number, stored in step 330, associated with the noun phrase; number-of-hits is the number of document matches, or "hits", found for this query; and proximity, which is more fully explained by way of the examples given below, is an indication of the proximity constraints used in the query. Table 1 represents the contents of an example of a frequency table according to this embodiment prior to the execution of initial queries:

TABLE 1

Example of a frequency table before initial queries are run

| i | 1 | 2 | 3 | 4 | ... |
|---|---|---|---|---|---|
| number of hits | 0 | 0 | 0 | 0 | ... |
| proximity | 0 | 0 | 0 | 0 | ... |

It will be observed that a single value is used to represent proximity information in this embodiment of the frequency table. A single value suffices because in this embodiment noun phrase queries that specify strict ordering—that is, queries of the form <p NP>—are performed if and only if the value of p is 0, and noun phrase queries that do not specify strict ordering—that is, queries of the form (p NP)—are performed if and only if the value of p is not 0. In other embodiments, separate values can be stored for proximity and strict ordering, or other information can be stored.

5.6 Initial Queries

In step 505, initial IR queries are constructed and executed. Initial queries are based on the noun phrases that were detected in the input string during question processing. There is one initial query for each such noun phrase. Each initial query is of the form <0 NP$_i$> where NP$_i$ is the text of the noun phrase whose unique index number is i. In other words, an initial query seeks to match the noun phrase exactly as it appears in the input string.

In an embodiment that uses the MAKE-QUERY function described above, step 505 is executed by repeated calls to E-QUERY, one for each initial query. After each such call to MAKE-QUERY returns, if MAKE-QUERY returns results—that is, if the number of hits is within the range established by the threshold and maximum values—then the frequency table is updated by setting the number-of-hits value for the initial query to the number of hits returned by MAKE-QUERY. Otherwise the number-of-hits value remains at zero or is set to the maximum, according to the artificial value returned by MAKE-QUERY. An example of this is illustrated in Table 2 below. Table 2 represents the contents of an example of a frequency table after the execution of four initial queries for index values i=1, 2, 3, 4:

TABLE 2

Example of a frequency table after initial queries are run

| i | 1 | 2 | 3 | 4 | ... |
|---|---|---|---|---|---|
| number of hits | 2 | 30 | 0 | 0 | ... |
| proximity | 0 | 0 | 0 | 0 | ... |

It can be seen that the first initial query returned 2 hits and the second returned 30 hits, while the third and fourth each returned a number of hits that was less than the threshold. For each query the proximity value is 0 because the proximity constraint value in the query is 0 and the query was a strict-order query.

In some embodiments, if a noun phrase contains only one word it can be processed without an initial query as such in step 505. In certain IR subsystems it is inefficient to run an initial query for a one-word noun phrase because information on the frequency of individual words within the text corpus is made directly available without the need for a query. Thus instead of calling MAKE-QUERY for the query <0 NP$_i$>, where i is the unique index number of the one-word noun phrase, in such embodiments the IR subsystem can be instructed to look up the frequency with which the single word that is the noun phrase appears in the corpus. This frequency is then stored in the frequency table as the number of hits associated with noun phrase i.

Step 505 is followed by step 510, which concerns the construction and execution of broadened versions of the initial queries of step 505. Broadened versions of initial queries are of the form (p NP$_i$)

where p is a proximity constraint. In other words, broadened versions of initial queries seek to match the words of the noun phrase regardless of the order in which they appear in a document so long as these words occur within a sequence of words that is at most p+2 words long. Broadened queries are executed when initial queries or previous broadened queries return insufficient hits.

Figure 6:
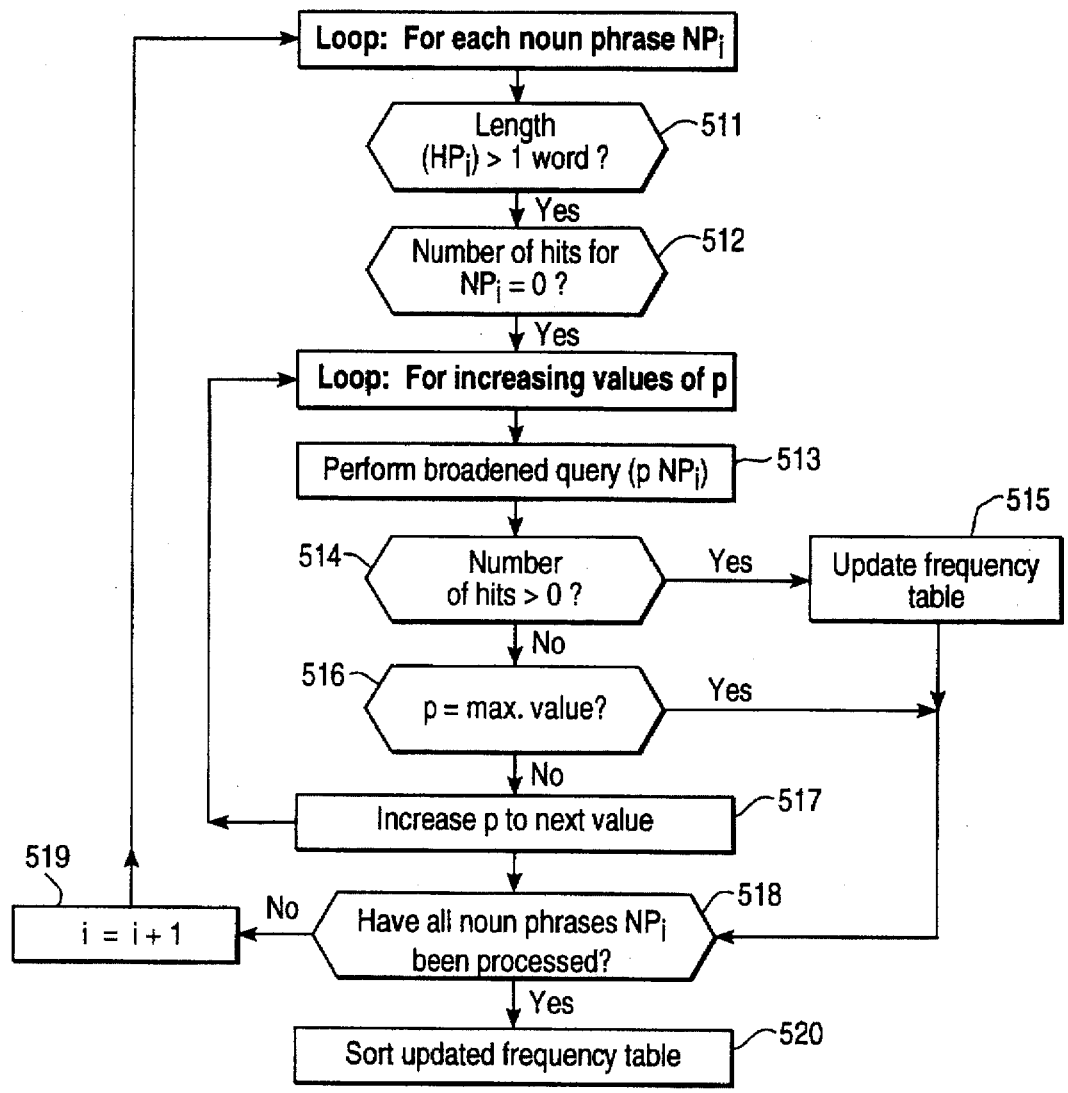
FIG. 6 flowcharts the component steps of initial query broadening in one embodiment of the method.

Step 510 comprises a number of component steps 511 through 520 as illustrated in FIG. 6. Steps 511 through 519 form a loop that is executed repeatedly n times, once for each noun phrase detected in the input string. In this embodiment the noun phrases have index numbers i that run consecutively from 1 to n. Thus each pass of the loop concerns the ith noun phrase—that is, the noun phrase whose unique index number is i. In step 520 the updated frequency table produced in the loop of steps 511 through 519 is sorted according to number of hits.

In step 511 the ith noun phrase is checked to see whether it contains more than one word. One-word noun phrases are not susceptible to broadening through relaxation of proximity constraints. If the ith noun phrase is only one word long, most of the remaining steps of the loop are skipped and execution proceeds at step 518.

If the ith noun phrase contains more than one word execution proceeds with step 512. In step 512 the frequency table is examined to determine whether the number of hits for the ith noun phrase is nonzero. The number of hits can be nonzero either because hits were found for the initial query (or the alternative direct determination of frequency for one-word noun phrases), or because hits were found for previous broadened initial queries. If the number of hits for the ith noun phrase is zero, execution proceeds at step 513; otherwise, most of the remaining steps of the loop are skipped and execution proceeds at step 518.

In steps 513 through 518 a loop is executed over a series of increasing proximity values p, for example, once for each of the values p=1, 5, 10, 20, and 40. This loop is executed either until a broadened initial query returns a number of hits that is in the range specified by the threshold and maximum values of MAKE-QUERY, or until the series of increasing proximity values is exhausted.

In step 513 a broadened initial query of the form (p $NP_i$), where $NP_i$ is the ith noun phrase, is constructed and executed. The query can be executed using MAKE-QUERY. In step 514 it is determined whether the number of hits returned by MAKE-QUERY is nonzero. If so, execution proceeds at step 515; otherwise execution proceeds at step 516.

In step 515 the frequency table is updated to reflect the number of hits detected by the broadened initial query of step 513. That is, the number-of-hits value associated with the index i in the frequency table is set equal to the number of hits returned by MAKE-QUERY. This is a value between the threshold and maximum values inclusive, with the maximum value representing any number of hits greater than or equal to the maximum. Thereafter execution proceeds at step 518.

In step 516, which is executed if the broadened initial query of step 513 detects a number of hits less than the threshold, the frequency table is left unchanged so that the number-of-hits value for noun phrase i remains at zero. The proximity value p is checked. If the proximity value has not yet achieved its maximum, then execution proceeds at step 517; otherwise execution proceeds at step 518.

In step 517 the proximity value p is updated to the next larger value. For example, if the series of increasing proximity values for the loop of steps 513 through 518 is p=(1, 5, 10, 20, 40) and step 513 was executed with p=10, then in step 517 p is increased to 20. Thereafter execution transfers back to step 513, where a broadened initial query using the newly updated proximity value will be run.

In step 518, the noun phrase index i is checked to see whether all n noun phrases have yet been processed. If not, then in step 519 the index value i is incremented and execution transfers back to the top of the loop at step 511; otherwise, the loop over noun phrases terminates and execution proceeds at step 520.

Table 3 represents the contents of an example of a frequency table after initial processing and broadening of queries for index values i=1, 2, 3, 4, but before execution of step 520:

TABLE 3

| | Example of unsorted frequency table after initial query broadening | | | | |
|---|---|---|---|---|---|
| i | 1 | 2 | 3 | 4 | ... |
| number of hits | 2 | 30 | 6 | 10 | ... |
| proximity | 0 | 0 | 10 | 5 | ... |

In Table 3, as in Table 2, 2 hits were detected for the initial query for noun phrase 1 and 30 hits were detected for the initial query for noun phrase 2. (It will be observed that if either of these noun phrases, for example, noun phrase 2, is only one word long, then its associated number of hits was determined directly from corpus frequency information, with no need for an initial query as such.) Thus no broadened queries were run for these two noun phrases. It can further be seen in Table 3 that 6 hits were detected for noun phrase 3, but only after the proximity constraint was broadened out to 10. Assuming that the series of proximity values p=1, 5, 10, 20, 40 is used, it follows that the initial query for noun phrase 3 both in its original form and broadened out to proximity constraints of 1 and 5 generated a number of hits below the threshold, for example, 0 hits. Similarly, 10 hits were detected for the broadened initial query for noun phrase 4 at a proximity value of 5, that is, for the query (5 $NP_4$); none were detected for the original initial query <0 $NP_4$> or the broadened initial query (1 $NP_4$).

In step 520 the frequency table is sorted in order of descending number of hits. For example, after step 520 the frequency table of Table 3 becomes the frequency table shown in Table 4:

TABLE 4

| | Example of sorted frequency table after initial query broadening | | | | |
|---|---|---|---|---|---|
| i | 2 | 4 | 3 | 1 | ... |
| number of hits | 30 | 10 | 6 | 2 | ... |
| proximity | 0 | 5 | 10 | 0 | ... |

In Table 4 the columns of Table 3 have been sorted so that the noun phrase for which the most hits were found appears in the leftmost column, the noun phrase for which the second most hits were found appears in the second-from-leftmost column, and so forth. Proximity values are not taken into account in the sorting of step 520.

The flowchart of FIG. 6 can be expressed more compactly as pseudocode, for example as follows:

```
/* Outer loop over noun phrases */
FOR i = 1 to n
   {IF (NP > 1 word) and (frequency_table(i) = 0)
      /* Inner loop over proximity values */
      {FOR p = (1, 5, 10, 20, 40)
         {/* Construct and execute query;
            save number of hits */
            query = (p NP_i);
            MAKE-QUERY (query,
               number_of_hits,
               results);
         /* If the number of hits was above the
            threshold, terminate inner loop
            by setting p equal to 40 */
         IF (number_of_hits >0)
            {frequency_table(i) = number_of_hits;
             p = 40;
            }
         }
      }
   }
```

Here the statement query=(p $NP_i$) constructs the query (p $NP_i$). The statement M-QUERY(query, number_of_hits, results) executes the query and returns the number of hits and the query results (if any) in the variables number_of_hits and results respectively. If no results are returned, the variable results is set to the Boolean value FALSE or to some other value indicating that results were not returned. In the remainder of this Part (Part II) of the description, pseudocode is used from time to time to express certain steps of the method.

5.7 Title Phrase Queries step 525 concerns queries based on title phrases. It is executed if any title phrases were detected during question processing; otherwise it is skipped. Step 525 comprises component steps according to the following pseudocode:

```
FOR i = 1 to t
  {IF (TP_i contains no high-frequency function words)
  10 {query = <0 TP_i>}
  ELSE /* query based on content words only */
    {l_i = number of intervening words between
         first and last content words of TP_i;
    query = <l_i TP_i (content1) TP_i (content2) ... >}
  MAKE-QUERY (query, number of hits, results);
  STORE(number of hits in association with TP_i);
  }
```

The FOR loop is executed repeatedly, once for each title phrase detected during question processing. It is assumed that there are a total of t title phrases $TP_i$ having unique index numbers i that run from 1 to t.

A query is constructed and executed for each title phrase. The query is formulated to match the exact wording of the title phrase as closely as possible. First the title phrase is checked to see whether it contains any high-frequency function words. These are words such as "the," "a," "and," "of," and so forth that typically appear with very high frequency in any text corpus. If the title phrase contains no high-frequency function words, a query of the form $<0\ TP_i>$ is constructed and executed. This query seeks the exact wording of the title. If the title phrase contains high-frequency function words, a query is constructed and executed based on the content words of the title, that is, the words that are most important in the title. For example, the title phrase "Across the River and Into the Trees" gives rise to the query <3 River Trees>, because "River" and "Trees" are the content words that appear in the title in a sequence in which "River" precedes "Trees" and is separated from "Trees" by at most 3 words.

Once the title phrase's query is constructed and executed, the number of hits detected is stored in association with the title phrase. The storage can be done in memory or in a storage device. In one embodiment the stored information is organized in an array of 2 rows by t columns, one column for each title phrase. In each column the top row is the unique index number of the title phrase and the bottom row is the number of hits. It can be seen that this is similar in structure to the noun phrase frequency table; however, there is no row for proximity values, because title phrases are not broadened by proximity constraint relaxation in this embodiment.

5.8 Interleaved Broadening and Narrowing

Steps 530 through 570 primarily concern compound queries. In these steps, a sequence or series of queries is performed. This sequence is designed to include optimal queries, where "optimal query" means a query that retrieves a manageable number (e.g., 2, 10, or 30, depending on the application) of relevant documents and very few if any irrelevant documents. Put another way, the sequence of queries is designed to find the documents the user needs and only the documents the user needs, and to do so through a systematic approach that is carried out transparently to the user.

In each of the steps 530 through 570, multiple queries can be generated by applying a set of interleaved broadening and narrowing operations to one or more base queries. To describe these broadening and narrowing operations it is helpful to begin with a concrete example. For ease of reference this example will be referred to in later sections as Example 1.

Consider an input string for which three noun phrases $NP_1$, $NP_2$, $NP_3$ are detected and no other phrases are detected. Suppose that after initial query processing the unsorted frequency table for this string is as follows:

| i              | 1  | 2  | 3  |
|----------------|----|----|----|
| number of hits | 30 | 3  | 12 |
| proximity      | 0  | 10 | 5  |

It will be observed that for each column of the table the number of hits and proximity value determine a query, specifically, the query that was executed when these values were stored. That is, the values in this frequency table came from the following three queries:

$<0\ NP_1>$ $(10\ NP_2)$ $(5\ NP_3)$

A combination query that includes these three queries can be constructed:

$[<0\ NP_1>(10\ NP_2)\ (5NP_3)]$

This query, which will be called the base query, is the Boolean AND of its three component noun phrase queries. It matches documents that contain all three noun phrases as modified according to the specified proximity and order constraints. The base query serves as the starting point for a series of queries generated automatically through systematic broadening and narrowing of the base query, for example:

| | | |
|---|---|---|
| $[(1\ NP_1)\ (10\ NP_2)\ (5\ NP_3)]$ | ! | broaden $NP_1$ query |
| $(40\ (1\ NP_1)\ (10\ NP_2)\ (5\ NP_3))$ | ! | narrowing |
| $(20\ (1\ NP_1)\ (10\ NP_2)\ (5\ NP_3))$ | ! | narrowing |
| ... | | |
| $[(5\ NP_1)\ (10\ NP_2)\ (5\ NP_3)]$ | ! | broaden it further |
| $(40\ (5\ NP_1)\ (10\ NP_2)\ (5\ NP_3))$ | ! | narrowing |
| $(20\ (5\ NP_1)\ (10\ NP_2)\ (5\ NP_3))$ | ! | narrowing |
| ... | | |
| $[(10\ NP_1)\ (10\ NP_2)\ (5\ NP_3)]$ | ! | even further |
| $(40\ (10\ NP_1)\ (10\ NP_2)\ (5\ NP_3))$ | ! | narrowing |
| $(20\ (10\ Np_1)\ (10\ NP_2)\ (5\ NP_3))$ | ! | narrowing |
| ... | | |
| $[<0\ NP_1>\ (20\ NP_2)\ (5\ NP_3)]$ | ! | broaden $NP_2$ query |
| $(40\ <0\ NP_1>\ (20\ NP_2)\ (5\ Np_3))$ | ! | narrowing |
| $(20\ <0\ NP_1>\ (20\ NP_2)\ (5\ NP_3))$ | ! | narrowing |
| ... | | |
| ... | | ! etc. |

The queries are broadened by successive relaxations of the proximity constraint of each component noun phrase query. Between broadenings the queries are narrowed by tightening the overall relative proximity constraint between the component noun phrase queries; specifically, the Boolean AND query, which seeks the component noun phrases anywhere within a document, is followed by proximity queries that seek the component noun phrases closer and closer together within a document. The procedure for generating the series of queries in the above example can be expressed in pseudocode as follows:

```
/* SET-UP */
/* Construct component queries for all noun phrases, using proximity
   values from unsorted frequency table. Noun phrases have index
   numbers from 1 to n. If the proximity associated with a noun phrase is
   0, the component query is a strict-order query; otherwise it is a
   proximity constraint query without strict ordering. If the number of
   hits associated with a noun phrase is 0, its component query is
   considered empty and is not included in the base query or used in the
   sequence of broadening and narrowing.
```

-continued

```
FOR i = 1 to n
   {hits(i) = frequency_table(2,i);
    proximity(i) = frequency_table(3 ,
    IF (hits(i) = 0)
       {component_query(i) = EMPTY}
    ELSE
       {IF (proximity(i) = Q)
          {component_query(i) = <O NP₁ >}
        ELSE
          {component_query(i) = (proximity(i) NP₁)}
       }
   }
/* Construct base query as Boolean AND of all non-empty component
queries. */
   base_query = [component query(i)],
        (FOR i= 1 to n,
            component_query(i) * EMPTY);
/* BROADENING */
/* Outer loop over all component queries: Broaden each component
query in turn by relaxing its proximity constraint, that is, by trying
all proximity values greater than the proximity value of the base query.
One-word noun phrase queries#and queries not present in the base
query are not broadened.
*/
   FOR i = 1 to n
      {FOR p = (1, 5, 10, 20, 40), p > proximity(i)
         {IF (NP₁ contains >1 word)
             and (component_query(i) is in base_query)
         /* Perform the Boolean AND query: Formulate the
         broadened ith component query and AND it with the other
         component queries of the base query. Execute the query
         thus constructed. */
             {broad(i) = (p NP₁);
              query = [broad(i) component#query (j)],
                 (FOR j= 1 to n, j ≠ i,
                    component_query (j)
                    is in base_query);
              MAKE-QUERY(query,number_of_hits,results);
         /* NARROWING */
         /* Inner loop, executed if the number of hits returned by the
         AND query exceeds a specified value: Narrow the query by
         tightening its overall proximity constraint, that is, the
         proximity constraint of the component noun phrases
         relative to one another. Narrow repeatedly until the
         number of hits returned is below the specified value or
         until all allowable proximity values have been tried. */
              FOR p = (40, 20, 10, 5)
                 {WHILE (number_of hits > VALUE)
                    {query =
                     (p broad(i) component_query(j)),
                        (FOR j= 1 to n, j ≠ i,
                           component_query (j)
                           is in base_query);
                     MAKE-QUERY (query,
                        number_of_hits,results);
                    }
                 }
             }
         }
      }
```

The specified value used in the narrowing loop can be, for example, 10. Like the threshold and maximum values used in MAKE-QUERY, it can be set by default or by the user in advance of execution. The specified value ensures that unnecessary narrowing is avoided, thereby improving computational efficiency. In some embodiments, an additional specified value can be used in conjunction with the outer broadening loop, so that if a query that includes the broadened ith component (p $NP_i$) returns more hits than the additional specified value, no further broadening is done for the ith component.

For all queries executed during the broadening and narrowing series, MAKE-QUERY saves non-redundant query results when the number of hits is within the range set by the threshold and maximum values. The results are simply saved at this point; they will be ranked later on in step 260.

With Example 1 in mind, steps 530 through 570 will now be described.

5.9 Combination Queries Title Phrase and Noun Phrase Combinations.

In step 530 combination queries that include both title phrases and noun phrases are performed. For each title phrase $TP_i$ for which a nonzero number of hits was found in step 525, a base query is constructed of the form

[<0 $TP_i$>(p, $NP_1$) ($P_2$ $NP_2$) . . . ]

Here and in what follows it is to be understood that although the title phrase component query is typically expressed in the form <0 $TP_i$>, if the title phrase contains high-frequency function words the actual query that is performed can be based on the content words of the title phrase and expressed in the form <p TP(content₁) TP(content₂) . . . > as described in conjunction with step 525 above. Likewise, although each noun phrase component query is expressed in the form ($p_j$ $NP_j$), where $p_j$ is the frequency table proximity value associated with the jth noun phrase $NP_j$, the component query can be <0 $NP_j$> if $p_j$=0 and is omitted if no hits were found during initial query processing for $NP_j$. The component query for noun phrase $NP_j$ is also omitted from the base query if noun phrase $NP_j$ is contained in title phrase $TP_i$.

Once the base query is formed it is broadened and narrowed in a manner similar to that described in Example 1 above. Each noun phrase component query $NP_j$ in the base query is broadened in turn through successive relaxations of its proximity constraint. For each such relaxation the query is narrowed by tightening the overall proximity constraint. Throughout this process the title phrase query is left unchanged. Component queries based on single-word noun phrases are not broadened.

As an example of step 530, suppose that the base query contains title phrase $TP_i$ and noun phrases $NP_1$ and $NP_2$, where $TP_1$ is "Gone With the Wind," $NP_1$ is "great fire" and $NP_2$ is "Scarlett O'Hara." If the proximity values for noun phrases $NP_1$ and $NP_2$ are 5 and 0 respectively, the base query is

[<3 Gone Wind> (5 great fire) <0 Scarlett O'Hara>]

If the list of proximity values to be tried is p=(1, 5, 10, 20, 40), then a series of queries such as the following is executed:

```
[<3 Gone Wind>(10 great fire) <0 Scarlett O'Hara>]
(40 <3 Gone Wind>(10 great fire) <0 Scarlett O'Hara>)
(20 <3 Gone Wind>(10 great fire) <0 Scarlett O'Hara>)
. . .
[<3 Gone Wind>(20 great fire) <0 Scarlett O'Hara>]
(40 <3 Gone Wind>(20 great fire) <0 Scarlett O'Hara>)
(20 <3 Gone Wind>(20 great fire) <0 Scarlett O'Hara>)
. . .
. . .
[<3 Gone Wind>(5 great fire) (1 Scarlett O'Hara)]
(40 <3 Gone Wind>(5 great fire) (1 Scarlett O'Hara))
(20 <3 Gone Wind>(5 great fire) (1 Scarlett O'Hara))
. . .
. . .
```

Upon completion of step 530, every title phrase $TP_i$ for which a nonzero number of hits was found in step 525 has had its respective base query processed according to the interleaved broadening and narrowing scheme.

Maximal noun phrase combination.

In step 540 combination queries are performed that include a maximal number of noun phrases. A base query is constructed that includes a component query for each noun phrase $NP_i$ for which a nonzero number of hits was found during initial query processing:

[($p_1$ $NP_1$) ($p_2$ $NP_2$) ($p_3$ $NP_3$) . . . ]

This will be called the maximal noun phrase base query or simply the maximal query. It will be appreciated that the base query from Example 1 is of this form. As in step 530 above, the proximity values $p_i$ are the proximity values from the frequency table. Also as in step 530 above, although each component query of the maximal query is expressed here in the form ($p_i$ $NP_i$), it is to be understood that the component query can be <0 $NP_i$>if $p_i$=0. Noun phrases for which no hits were found during initial query processing are omitted from the maximal query. Once formed, the maximal query is broadened and narrowed in the manner of Example 1.

It will be observed that the maximal query can contain noun phrases that are parts of title phrases. This can lead to more robust performance, for example, when a user enters an incorrect or partial title in the input string.

Lesser noun phrase combinations.

In step 545 combination queries are performed that include some but not all of the noun phrases included in the maximal query. Base queries are constructed by dropping one, two, or more component queries from the maximal query. Each component, pair of components, etc. is dropped in turn. The greater the number of components dropped, the broader the query.

An example illustrates this. If the maximal query is

[<0 black cat> (5 yellow dog) (40 pink frog) (20 blue tiger)]

then base queries can be constructed such as

---

[(5 yellow dog) (40 pink frog) (20 blue tiger)]
[<0 black cat> (40 pink frog) (20 blue tiger)]
[<0 black cat> (5 yellow dog) (20 blue tiger)]
[<0 black cat> (5 yellow dog) (40 pink frog)]
[(40 pink frog) (20 blue tiger)]
[(5 yellow dog) (20 blue tiger)]
[(5 yellow dog) (40 pink frog)]
[<0 black cat> (20 blue tiger)]
[<0 black cat> (40 pink frog)]
[<0 black cat> (5 yellow dog)]

---

In some embodiments only single components are dropped from the maximal query in step 545. In other embodiments only single components and pairs of components are dropped. In still other embodiments all combinations of k components, k=1 to m−2 where m=the total number of components in the maximal query, are dropped. In yet other embodiments the order of processing can be reversed, so that base queries of k components, k=2 to m−1, are constructed and processed.

Main verb combinations.

Step 550 concerns queries that involve main verbs. Base queries are formed by adding one or more main verbs to the title-phrase or noun-phrase base queries constructed in steps 530, 540, and 545. These queries can then be broadened and narrowed in some embodiments.

For example, consider once again the example in which a title-phrase base query contains the title phrase "Gone With the Wind" and the noun phrases "great fire" and "Scarlett O'Hara," with proximity constraint values for these noun phrases of 5 and 0 respectively. Suppose further that the input string contains one main verb, "burn." Then a base query can be constructed as

[burn <3 Gone Wind> (5 great fire) <0 Scarlett O'Hara>]

and can be broadened and narrowed by relaxing the proximity constraints of the noun phrase component queries and tightening the overall proximity constraint between component queries as described above. If there is another main verb in the input string, for example "mend," then a second base query can be constructed as

[mend <3 Gone Wind> (5 great fire) <0 Scarlett O'Hara>]

and a third base query containing both main verbs can be constructed as

[burn mend <3 Gone Wind> (5 great fire) <0 Scarlett O'Hara>]

Each of these base queries can be broadened and narrowed in the manner described above.

The addition of main verbs to compound queries serves effectively to narrow those queries. Thus in some embodiments main verb queries are performed when title-phrase or noun-phrase compound queries return a number of hits that exceeds a specified value even after overall proximity constraint is narrowed to its lowest proximity value. As with other specified values discussed above, the specified value used to trigger main verb queries can be set by default or by the user in advance.

In some embodiments the IR subsystem performs automatic stemming of main verbs, that is, reduction of verbs to their uninflected form. In other embodiments stemming is performed by the primary query construction subsystem in the context of constructing base queries using main verbs.

5.10 Additional Queries

In some embodiments, as shown in FIG. 5, steps 560 and 570 are performed. In these steps attempts are made to detect additional hits for noun phrases or title phrases. Steps 560 and 570 can be particularly helpful with regard to noun phrases or title phrases for which few hits are detected in previous steps.

Head words.

Step 560 concerns queries based on the head words of noun phrases. The "head word" of a noun phrase is the most important or significant word in the noun phrase. In English the head word is typically the rightmost word in the noun phrase. For example, in the phrase "great horned owl" the head word is "owl." The head word of a noun phrase can be detected, for example, using the input string analysis developed during question processing.

In one embodiment a simple query that seeks just the head word is constructed and executed for each noun phrase of more than one word for which a number of hits below a specified minimum number is recorded in the frequency table. The specified minimum can be set by default or by the user in advance. The simple head word query serves to broaden the noun phrase query beyond the scope of the initial query and the proximity-broadened versions of the same by dropping the constraint that requires all words of the noun phrase to be present in the document.

As an example, if the noun phrase "great horned owl" generated 0 hits even after its proximity was broadened to the maximum value of 40, so that the query (40 great horned owl)

generated 0 hits, then the simple head word query owl could be run. Alternatively, the frequency of the word "owl" in the text corpus can be provided directly by the IR subsystem in embodiments that support this.

In some embodiments compound queries comprising the simple head word query and other components such as noun phrase queries, title phrase queries, main verbs, or other head word queries can be constructed and executed, for example if the simple head word query detected hits and the initial query from which it was derived did not. Such compound queries can be broadened and narrowed by varying proximity constraints after the manner of Example 1 in some embodiments.

Related words.

Step 570 concerns queries in which certain words of the input string are replaced by substitute related words such as synonyms or hyponyms. Related words can be drawn from a thesaurus, dictionary, or any other appropriate information source made available to the system. Related word substitution is a broadening operation in that a series of queries based on the set of words comprising both the original words of the input string and words related to these original words will tend to generate a greater number of hits than a series of queries based on the original words only.

Related words can be used in conjunction with simple or compound title phrase queries by substituting at least one related word for one or more of the content words in the title phrase. Related words can be used in conjunction with simple or compound noun phrase queries by substituting at least one related word for one or more of the words in the noun phrase, for example, for the head word of the noun phrase. Related words can be used in conjunction with simple or compound main verb queries by substituted at least one related word for each main verb.

In one embodiment related word substitution is performed for each noun phrase for which a number of hits below a specified minimum number is recorded in the frequency table and also for each title phrase for which a number of hits below a (possibly different) specified number was found in step 525. Each of the specified minima can be set by default or by the user in advance.

Related word substitution can be performed in conjunction with head word queries in some embodiments. For example, if after broadening an initial query to its maximum proximity value and thereafter further broadening it by dropping words other than the head word the number of returned hits remains unacceptably low, the simple head word query can be yet further broadened by substituting one or more synonyms or hyponyms for the head word.

In some embodiments compound queries comprising one or more related word substitutions can be broadened and narrowed by varying proximity constraints after the manner of Example 1.

6. Results Ranking

This section examines step 260, results ranking, in detail. Results ranking comprises ordering the results (matched documents) retrieved in step 240 to determine which are most likely to be relevant to the user's question or other input string. A great many results ranking strategies are contemplated within the scope of the invention; one such strategy is described here.

Figure 7:
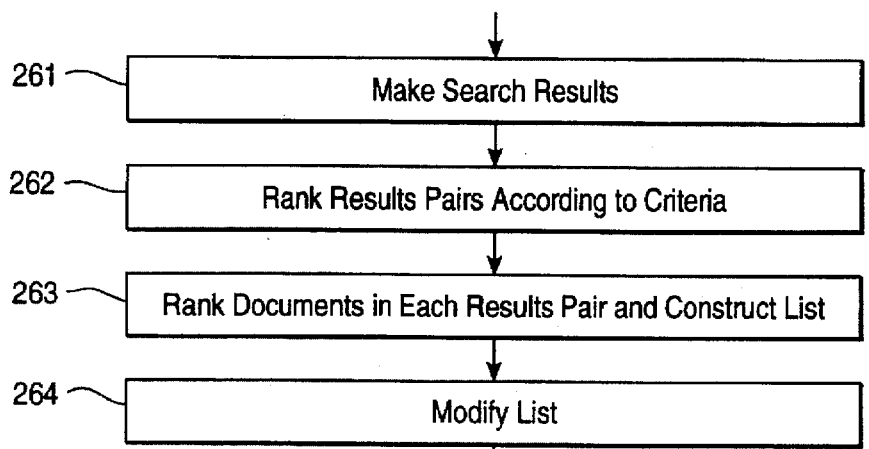
FIG. 7 flowcharts the component steps of results ranking in one embodiment of the method.

Step 260 proceeds in component steps 261, 262, 263, and 264 as shown for one embodiment in FIG. 7. In step 261 the search results generated by the queries of step 240 are made available for ranking. These results are pairs of the form (query document-list)

In step 262 these results pairs are ranked according to criteria, the criteria being selected so as to place the most relevant results at the top of the ranking. In step 263 documents within the pairs are ranked and a list of documents or document identifiers to be output is constructed. In some embodiments step 264 is executed in which this list can be modified. The list created in step 263 as modified in step 264 becomes the list that is output to one or more destinations such as the user, storage, or another process in step 280. Steps 261, 262, 263, and 264 will now be more fully described.

6.1 Results Pairs

At the beginning of step 260 it is assumed that non-redundant queries have been stored in association with their respective results. It will be recalled that the MAKE-QUERY routine described earlier does such storage.

In step 261 the associated queries and results are retrieved from storage or otherwise made available for further processing. For example, they can be placed in memory in an association list or equivalent data structure comprising pairs of queries and document lists, each such document list being a list of the documents that were retrieved by the IR subsystem from the text corpus when the document list's associated query was executed:

$$( \quad (query_1 \ (document_{1,1} \ document_{1,2} \ ...)) \\ (query_2 \ (document_{2,1} \ document_{2,2} \ ...)) \\ ... \\ (query_k \ (document_{k,1} \ ... \ document_{k,j} ...)) \\ ... \\ \quad )$$

Each element of this association list will be called a results pair.

6.2 Ranking of Results Pairs

In step 262 the results pairs are ranked according to one or more criteria. Criteria are typically chosen such that documents most likely to be relevant to the user's question are ranked highest. Many different kinds of criteria can be used as the basis for results ranking. In one embodiment four criteria are used: (1) number of title phrase words matched; (2) number of capitalized words matched; (3) total number of words matched; (4) smallest number of documents in document list. Each of these criteria will now be described.

(1) Number of title phrase words matched.

The most highly ranked results pairs are those for which the queries include words from one or more title phrases. The more title phrases used to generate the query and the more words from each title phrase are included in the query, the higher is the ranking of the results pair. A rationale behind this criterion is that if a title phrase is found in a document, that document is likely to be highly relevant. The more title words that are found, the more likely relevant is the document.

(2) Number of capitalized words matched.

The next most highly ranked results pairs are those for which the queries include words having initial capital letters. The greater the number of such words in the query, the higher the ranking of the result pair. This criterion gives greater weight to queries that contain proper nouns such as person or place names. It is applied only for results pairs that do not meet criterion (1), that is, results pairs whose queries do not include component queries based on title phrases.

(3) Total number of words matched.

The third most highly ranked results pairs are those for which the queries have relatively many words. The more words in the query, the higher the ranking of the result pair. This criterion is applied only for results pairs that do not meet criteria (1) or (2), that is, results pairs whose queries do not include component queries based either on title phrases or on noun phrases with initial capital letters.

(4) Smallest number of documents in document list.

Results pairs that do not meet any of criteria (1), (2), or (3) are ranked least highly. Among themselves such results pairs are ranked according to the number of documents retrieved. Results pairs that have fewer documents are more highly ranked than those that have many documents.

An example of applying the four criteria will now be given. Suppose that results pairs for the following four queries are to be ranked:

1) [<0 Great Britain> <0 Ireland>]
2) [Ireland sea]
3) [<0 Great Britain> ocean]
4) [Britain ocean sea]

None of the queries contains a title phrase, so the first ranking criterion does not apply. Query 1 contains 3 words with initial capital letters, query 3 contains 2, and queries 2 and 4 each contain 1. Therefore according to the second ranking criterion results pair 1 is ranked highest and results pair 3 second highest. As between results pairs 2 and 4, query 4 contains 3 words while query 2 contains only 2. Therefore according to the third ranking criterion query 4 is ranked higher. The final ranking is thus 1, 3, 4, 2.

If in the previous example the second and fourth queries are changed to:

2) [Ireland ocean sea]

4) [Britain ocean sea]

then the third ranking criterion does not apply. Further supposing that query 2 generated 3 hits and query 4 generated 5, then according to the fourth ranking criterion results pair 2 is ranked above results pair 4, so that the final ranking becomes 1, 3, 2, 4.

6.3 Presentation List Construction

In step 263 documents within one or more ranked results pairs are ranked according to one or more criteria, and an ordered list of documents most likely to be relevant to the user's question or input string is constructed based on this ranking. This ordered list, which will be called the presentation list, becomes the ordered list of relevant documents that is output in step 280, either directly or, in some embodiments, as modified in step 264.

The presentation list contains N unique documents in it. That is, there are N documents in the list, and none of these documents is the same as any other. N is a number set by default or in advance by the user. N can be, for example, 3 or 30, depending on the application.

In step 263, as in step 262, many kinds of ranking criteria can be used. In one embodiment, a single criterion is used, namely, the number of words that appear in the input string and do not appear in the query of the results pair. Documents that contain the greatest number of such words receive the highest rank. An example illustrates this. Suppose that the top-ranked results pair has two documents, $doc_{i,1}$ and $doc_{1,2}$, in its document list (that is, its query, query i, generated two hits):

([<0 Great Britain> Ireland] ($doc_{i,1} doc_{i,2}$))

Suppose further that the input string contained an additional word such as the verb "cross" (as in "crossing the sea"). Then if $doc_{i,1}$ contains the word "crossing" but $doc_{i,2}$ does not, $doc_{i,1}$ is ranked above $doc_{i,2}$. Next suppose that the second-ranked results pair has four documents in its document list, which in order from highest rank to lowest are ($doc_{i,1}$ $doc_{i,7}$ $doc_{i,3}$ $doc_{i,5}$).

Then if N=3, for example, the 3 documents $doc_{i,1}$ $doc_{i,2}$ and $doc_{i,7}$ are the top-ranking, most-probably-relevant documents produced by step 263. $doc_{i,1}$ is ranked the highest because it is the highest-ranking document from the highest-ranking results pair. $doc_{i,2}$ is ranked second because it is the second highest-ranking document from the highest-ranking results pair. $doc_{i,7}$ is ranked third because it is the highest-ranking unique document from the second highest-ranking results pair, that is, the highest-ranking document that is in the second-ranked results pair and that is not in the first-ranked results pair. Because N unique documents are present in the first two results pairs, the ranking of documents of any remaining results pairs is skipped in this embodiment.

The foregoing procedure can be expressed in pseudocode, for example as follows:

```
/* Initialize the document counter to 0 and the presentation list to the
   empty list. The document counter keeps track of how many documents
   have been added to the presentation list. */
document_counter =
presentation_list = EMPTY;
/* Seek N unique documents. */
WHILE (document_counter <N)
  /* Outer loop over r results pairs. */
  {FOR i = 1 to r
    {SORT (all documents doc_i,j from results pair i
      according to ranking criteria);
    /* Inner loop over the d ranked documents from results pair i */
    FOR j = 1 to d_i
      {IF (jth sorted document is not yet in
        presentation_list)
      {ADD doc_i,j to the end of
        presentation_list;
      document_counter = document_counter + 1
      }
    }
  }
}
```

In some embodiments different ranking criteria can be used. For example, consideration can be given to the frequency of particular search terms within the retrieved documents or within the text corpus as a whole. In embodiments in which synonyms are used in queries, priority can be given to queries based on original words over queries based on synonyms.

In some embodiments the presentation list comprises a list of document identifiers instead of a list of documents.

6.4 Modifications to Presentation List

In some embodiments, as shown in FIG. 7, step 264 is executed after step 263. In step 264 the presentation list created in step 263 can be modified. Typically such modification is done to enhance the presentation of output to the user or to make the output suitable for further processing. A wide variety of modifications to the presentation list is possible in step 264 within the scope of the invention.

In some embodiments the documents in the presentation list can be alphabetized by title or otherwise reordered in step 264.

In some embodiments additional information can be added for each document in the presentation list in step 264. For example, the additional information can comprise information about the queries used to retrieve the documents. Suppose that a document was retrieved in response to a query containing a particular title phrase. This title phrase can be identified as a title phrase and can be highlighted in the text of the retrieved document, for example by a distinctive text presentation such as boldfacing, italicization, underlining, or a special font. As another example, the additional information can comprise match sentences, that is, sentences in the retrieved documents that caused or helped to cause the documents to be retrieved. Again supposing that a document was retrieved in response to a query containing a particular title phrase, the sentence or sentences in which this title phrase occurs can be associated with the retrieved document.

7. Alternative Embodiments

The foregoing embodiment of the method is only one possible embodiment among many. Moreover, variations of the method fall within the scope of the invention. A few alternative embodiments will now be briefly described. Further alternatives will be apparent to those of skill in the art.

Alternative techniques can be used to carry out question processing in step 220. For example, a parser based on a context-free grammar can be used. Case-splitting of noun phrases need not be performed. Cues other than or in addition to text formatting can be used to detect title phrases. Most generally, any technique can be used that converts the natural language input string into phrases—that is, contiguous, relatively short sequences of words—that can subsequently be used as the basis for IR queries in query reformulation step 240. The types of phrases detected in step 220 need not be limited to noun phrases, title phrases, and verb phrases.

Step 240 can likewise be carried out using alternative techniques. For example, a query language with a greater variety of features than the simple query language described above can be use. Such features can include, for example, sentence- and paragraph-based proximity constraints.

Details of component steps of step 240 can vary as well. For example, in some embodiments step 525 can further comprise the construction and execution of additional IR queries based on combinations of two or more titles in cases where queries based on single title phrases generate excessively large numbers of hits. As another example, although the particular sequence of broadening and narrowing operations described in connection with Example 1 above is effective and computationally efficient, it will be appreciated that other sequences of interleaved broadening and narrowing can be used within the scope of the invention. In yet another example, an IR subsystem that caches the results of partial Boolean expressions can be incorporated to reduce redundant searching during broadening. In still another example, for input strings comprising multiple sentences or comma-delimited clauses, input string punctuation can be used to help determine which noun phrases should be grouped together in compound queries.

In a further example, when component queries are dropped in step 245, in some embodiments only selected component queries are dropped, for example, when dropping all possible component queries would require considerable computation time. If only selected component queries are dropped, it is preferable in some embodiments to drop first those components that appear with the greatest frequency in the corpus, that is, which had the largest number of hits. Dropping high-frequency component queries tends to improve the likelihood that documents retrieved by the resulting broadened queries will be specifically relevant to the input string.

Part III. Murax

1. Organization of Part III

Part III of the description focuses on MURAX, a system that embodies the method of the present invention in the context of a larger two-phase method for answering a natural-language question. MURAX provides a robust linguistic approach for answering natural-language questions about specific facts. It derives its answers to questions from a database comprising an on-line encyclopedia. MURAX has been implemented and tested using a hardware configuration in which a Sun SparcStation workstation runs both the primary query construction and answer extraction subsystems, and the information retrieval subsystem and its associated corpus are located remotely from the Sun workstation and are accessed by the workstation via a network.

The rest of Part III is organized as follows: In Section 2 the motivation for MURAX's question-answering task is given, along with a description of the kind of questions that are its concern and their characteristics. Section 3 describes the system components. These include the encyclopedia and the IR system for accessing it. Shallow linguistic analysis is done using a part-of-speech tagger and finite-state recognizers for matching lexico-syntactic patterns.

Section 4 describes the analysis of a question by considering an example and illustrates the system output. Analysis proceeds in two phases. The first, primary query construction, finds articles that are relevant to the question. The second phase (called answer extraction) analyzes these articles to find noun phrases (called answer hypotheses) that are likely to be the answer.

Both phases require searching the encyclopedia. Queries made during the first phase are called primary queries, and only involve phrases from the question. The second phase creates secondary queries which MURAX generates to verify specific phrase relations. Secondary queries involve both answer hypotheses and phrases from the question.

Section 5 explains the primary query construction phase, which is carried out in MURAX according to the method of the present invention. Section 6 explains the answer extraction phase, which is carried out in MURAX according to the method of co-pending application entitled METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION as incorporated hereinabove by reference. Section 7 presents a performance evaluation of MURAX.

2. Task Selection

MURAX's task is to answer certain general-knowledge questions using a text corpus that comprises an encyclopedia. There are several reasons for choosing this task. Robust analysis is needed for the task because the encyclopedia is composed of a significant quantity of unrestricted text. General knowledge is a broad domain, which means that it is impractical to manually provide detailed lexical or semantic information for the words of the vocabulary (the encyclopedia contains over 100,000 word stems).

MURAX demonstrates that shallow syntactic analysis can be used to practical advantage in broad domains, where the types of relations and objects involved are not known in advance and may differ for each new question. Its analysis capitalizes on the information available in a question and profits from treating the encyclopedia as a lexical resource. MURAX also demonstrates that natural language analysis can add to the quality of the information retrieval process, providing text to the user that confirms phrase relations and not just word matches.

MURAX uses questions that have definite answers. This means that its performance can be evaluated in a straightforward way by using a set of questions and correct answers. Given a correct noun phrase answer, it is generally easy to judge whether a noun phrase hypothesized by the system is correct or not. Thus relevance judgements are simplified, and if one correct hypothesis is considered as good as any other, recall measurements are not required and performance can be considered simply as the percentage of correctly hypothesized answers.

2.1 Question Characteristics

MURAX operates on closed-class questions. A closed-class question is a direct question whose answer is assumed to lie in a set of objects and is expressible as a noun phrase. Put another way, a closed-class question is a question, stated in natural language, that assumes some definite answer typified by a noun phrase rather than by a procedural answer. Examples of closed-class questions are given below in Table 5.

TABLE 5

Example Questions

1. What U.S. city is at the junction of the Allegheny and Monongahela rivers?

2. Who wrote "Across the River and into the Trees"?
3. Who married actress Nancy Davis?
4. What's the capital of the Netherlands?
5. Who was the last of the Apache warrior chiefs?
6. What chief justice headed the commission that declared: "Lee Harvey Oswald . . . acted alone."?
7. What famed falls are split in two by Goat Island?
8. What is November's birthstone?
9. Who's won the most Oscars for costume design?
10. What is the state flower of Alaska?

(These Trivial Pursuit questions are Copyright Horn Abbott Ltd. Trivial Pursuit is a Registered Trademark of Horn Abbot Ltd.)

The questions in Table 5 appear in the general-knowledge "Trivial Pursuit" game and typify the form of question that is the concern of the MURAX task. These questions have the virtue of being created independently of the retrieval task (that is, they are unbiased) and have a consistent and simple stylized form. Yet they are flexible in their expressive power.

The interrogative words that introduce a question are an important source of information. They indicate particular expectations about the answer and some of these are illustrated below in Table 6.

TABLE 6

Question Words and Expectations

Who/Whose: Person
What/Which: Thing, Person, Location
Where: Location
When: Time
How Many: Number Notable omissions here are the words why and how. Questions that begin with "why" or "how" typically expect a procedural answer rather than a noun phrase answer (e.g., "How do you make a loaf of bread?").

The expectations established by the interrogative words can be used to filter various answer hypotheses. The answers to questions beginning with the word "who" are likely to be people's names. This fact can be used to advantage because various heuristics can be applied to verify whether a noun phrase is a person's name.

A question introduced by "what" may or may not refer to a person; however, other characteristics can be exploited. Consider the following sentence fragments, where NP symbolizes a noun phrase: "What is the NP . . . " and "What NP . . . " The noun phrase at the start of such questions is called the question's type phrase and it indicates what type of thing the answer is. The encyclopedia can be searched to try to find evidence that an answer hypothesis is an instance of the type phrase (details are presented An section 6.1.1 below). The verbs in a question are also a useful source of information as they express a relation that exists between the answer and other phrases in the question.

The answer hypotheses for "Where . . . " questions are likely to be locations, which often appear with locative prepositions or as arguments to verbs of motion. Questions of the form "When . . . " often expect answer hypotheses that are dates or times and the expectation of questions beginning "How many . . . " are numeric expressions.

3. Components

An on-line version of Grolier's Academic American Encyclopedia (*The Academic American Encyclopedia*, Danbury, Conn.: Grolier Electronic Publishing, 1990) serves as the text corpus for MURAX. The on-line encyclopedia contains approximately 27,000 articles, which are accessed via the Text Database (D. R. Cutting, J. Pedersen, and P. -K. Halvorsen, "An object-oriented architecture for text retrieval," in *Conference Proceedings of RIAO '91, Intelligent Text and Image Handling*, Barcelona, Spain, April 1991, pages 285–298), which is a flexible platform for the development of retrieval system prototypes and is structured so that additional functional components, e.g., search strategies and text taggers (see D. Cutting, J. Kupiec, J. Pedersen, and P. Sibun, "A practical part-of-speech tagger," in *Proceedings of the Third Conference on Applied Natural Language Processing*, Trento, Italy, April 1992, ACL) can be easily integrated.

The components responsible for linguistic analysis in MURAX are a part-of-speech tagger and a lexico-syntactic pattern matcher. The tagger is based on a hidden Markov model (HMM). HMM's are probabilistic and their parameters can be estimated by training on a sample of ordinary untagged text. Once trained, the Viterbi algorithm is used for tagging.

To assess performance, an HMM tagger (J. M. Kupiec, "Robust part-of-speech tagging using a hidden Markov model," *Computer Speech and Language*, 6:225–242, 1992) was trained on the untagged words of half of the Brown corpus (W. N. Francis and F. Kučera, *Frequency Analysis of English Usage*, Houghton Mifflin, 1982) and then tested against the manually assigned tags of the other half. This gave an overall error rate of 4% (corresponding to an error rate of 11.2% on words that can assume more than one part-of-speech category). The percentage of tagger errors that affect correct recognition of noun phrases is much lower than 4%. The tagger uses both suffix information and local context to predict the categories of words for which it has no lexicon entries.

The HMM used for tagging the encyclopedia text was also trained using the encyclopedia. A benefit of such training is that the tagger can adapt to certain characteristics of the domain. An observation in this regard was made with the word "I". The text of the encyclopedia is written in an impersonal style and the word is most often used in phrases like "King George I" and "World War I". The tagger trained on encyclopedia text assigned "I" appropriately (as a proper noun) whereas the tagger trained on the Brown corpus (a mixture of different kinds of text) assigned such instances as a pronoun.

Given a sentence of text, the tagger produces a sequence of pairs of words with associated part-of-speech categories. These enable phrase recognition to be done. Phrases are specified by regular expressions in the finite-state calculus (Hopcroft and Ullman, supra). Noun phrases are identified solely by part-of-speech categories, but more generally categories and words are used to define lexico-syntactic patterns against which text is matched.

Initially, only simple noun phrases are identified because they are recognized with the greatest reliability. Analysis involving prepositional phrases or other coordination is applied subsequently as part of more detailed matching procedures.

Word-initial capitalization turns out to be useful for splitting noun phrases appropriately. Thus "New York City borough" is split into "New York City" and "borough". Such case-splitting improves the efficiency of Boolean query construction, because queries based on case-split noun phrases tend to generate phrase matches directly. This reduces the need to drop several words successively from a noun phrase in order to produce a match.

3.1 Title Phrases

A title phrase is a multi-word phrase that is the title of a film, book, play, etc. It is usefully treated as a single unit in MURAX. A title phrase need not be a noun phrase. For example, the title "Play Misty for Me" contains the verb "play".

Title phrases are readily identified when marked typographically by enclosing quotes or italics. However, title phrases may be marked only by word-initial-capitalized letters. Furthermore, some title phrase words, such as short function words, need not be capitalized. Thus, the correct extent of the title phrase can be ambiguous and alternative possibilities must be accommodated. In MURAX the most likely alternative is chosen after phrase matching has been done and the alternatives compared, based on the matches and frequency of the alternative interpretations.

4. Operational Overview

This section presents an overview of the two-phase operation of the MURAX system, along with an example of the output of the system. The context is the example question presented Table 7 below.

TABLE 7

Example Question and Component Noun Phrases

| "Who was the Pulitzer Prize- winning novelist that ran for mayor of New York City?" | |
|---|---|
| Pulitzer Prize | winning novelist |
| mayor | New York City |

4.1 Primary Query Construction

In its first phase of processing MURAX embodies the method of the present invention. Simple noun phrases and main verbs are first extracted from the input question, as illustrated in Table 7. These phrases are used in a query construction/refinement procedure that forms Boolean queries with associated proximity and order constraints (section 5). The queries are used to search the encyclopedia to find a list of relevant articles.

The relevant articles are heuristically scored according to the degree and number of matches with the phrases of the input question. Matching head words in a noun phrase receive double the score of other matching words in a phrase. Words with matching stems but incompatible part-of-speech categories are given minimal scores.

After scoring, the relevant articles are ranked according to their scores. A subset of the ranked articles is made available for the second phase of processing. MURAX assumes that these articles, which are called the primary documents, contain the answer to the user's question.

4.2 Answer Extraction

In its second phase of processing MURAX embodies the method of co-pending application entitled METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION as incorporated hereinabove by reference.

Answer extraction begins by finding all simple noun phrases contained in the match sentences of the primary documents, that is, in those sentences that caused or helped to cause the primary documents to be retrieved. The match sentences correspond to one or more phrases of the input question. Each noun phrase found becomes an answer hypothesis that is distinguished by its component words and the article and match sentence in which it occurs.

Answer hypotheses are scored on a per-article basis according to the sum of the scores of the articles in which they occur. The purpose of this is to minimize the probability of overlooking the correct answer hypothesis if a subsequent non-exhaustive search is performed using the hypotheses.

For each answer hypothesis the system tries to verify phrase relations implied by the question. For the question in Table 7, it will be observed that the answer is likely to be a person (indicated by "who"). The type phrase indicates that the answer is preferably a "Pulitzer Prize winning novelist", or at least a "novelist" as indicated by the head noun of the type phrase. The relative pronoun indicates that the answer also "ran for mayor of New York City". Phrase matching procedures (detailed in section 6) perform the verification using the answer hypotheses and the primary documents.

Verification is not limited to primary documents. It can happen that a pertinent phrase relation is not present in the primary documents although it can be confirmed elsewhere in the encyclopedia. This is because too few words are involved in the relation in comparison to other phrase matches, so the appropriate sentence does not rank high enough to be in the selected primary documents. It is also possible that appropriate verification information is not expressed in any primary document and depends only on the answer hypothesis. This is the case with one heuristic that MURAX uses to attempt to verify that a noun phrase represents a person's name. The heuristic involves looking for an article that has the noun phrase in its title; thus if the article does not share any phrases with the question, it would not be part of any primary document.

Secondary queries are used as an alternative means to confirm phrase relations. A secondary query may consist of solely an answer hypothesis (as for the heuristic just mentioned) or it may also include other phrases from the input question, such as the type phrase of the question. To find out whether an answer hypothesis is a "novelist", for example, a query comprising the answer hypothesis and the word "novelist" is constructed and executed to yield a list of relevant articles. Documents whose match sentences contain co-occurrences of an answer hypothesis and a question phrase are called secondary documents. MURAX analyzes secondary documents using lexico-syntactic patterns to see if answer hypotheses can be validated as instances of the type phrase.

4.3 System Output

For the question given in Table 7 MURAX produces the output shown in Table 8.

TABLE 8

Output for Example Question

| The best matching phrase for this question is: Mailer, Norman | |
|---|---|
| The following documents were most relevant: | |
| Document Title: | Mailer, Norman |
| Relevant Text: | |
| • | "The Armies of the Night (1968), a personal narrative of the 1967 peace march on the Pentagon, won Mailer the Pulitzer Prize and the National Book Award." |
| • | "In 1969 Mailer ran unsuccessfully as an independent candidate for mayor of New York City." |
| Document Title: | novel |
| Relevant Text: | |
| • | "Among contemporary American novelists, Saul Bellow, John Dos Passos, John Hawkes, Joseph Heller, Norman Mailer, Bernard Malamud, Thomas Pynchon, and J.D. Salinger have reached wide audiences." |
| Next best: | Edith Wharton, William Faulkner |

The presentation here is different from that of prior art IR systems. Answer hypotheses are shown to the user to focus his or her attention on likely answers and how they relate to other phrases in the question. The text presented is not necessarily from documents that have high similarity scores, but rather from documents that confirm phrase relations that lend evidence for an answer. This behavior is readily understood by users, even though they have not been involved in the tedious intermediate work done by the system.

In Table 8, the first two sentences are from primary documents. The last sentence confirming Norman Mailer as a novelist is a from a secondary document. The sentence was confirmed by a lexico-syntactic pattern which identifies the answer hypothesis as being in a list-inclusion relationship with the type phrase.

MURAX's approach contrasts with the alternative, prior art approach of vector-space search. Vector-space search using full-length documents is not as well suited as MURAX's approach to the task that MURAX performs. For the example question, a vector-space search was done using a typical similarity measure and the bag of content words of the question. The most relevant document (about Norman Mailer) was ranked 37th. Somewhat better results can be expected if sentence or paragraph level matching is done. However, the resulting text matches do not have the benefit of being correlated in terms of a particular answer, and they muddle information for different answer hypotheses.

5. Primary Query Construction

This section describes in further detail how MURAX performs primary query construction. In accordance with the method of the present invention, MURAX translates phrases from a question into Boolean queries with proximity and order constraints. These queries are passed to an IR system which searches the encyclopedia and returns a list of matching documents (or hits). It is assumed that the IR system can process the following kinds of primitive queries, as well as compound queries constructed of these primitives:

1. The Boolean AND of terms, denoted here as:
   [$term_1$ $term_2$ ... $term_n$]
2. Proximity of a strict sequence of terms, separated by up to p other terms denoted here as:
   <p $term_1$, $term_2$, ... $term_n$>
3. Proximity of an unordered list of terms, separated by up to p other terms denoted here as:
   (p $term_1$, $term_2$, ... $term_n$)

The overall process is illustrated with an example question, which will be called Example 2 below:

"Who shot President Lincoln?"

The question is first tagged and the noun phrases and main verbs are found. In Example 2 the only noun phrase is President Lincoln and the main verb is shot. Boolean terms are next constructed from the phrases. At the outset a strict ordering is imposed on the component words of phrases. For Example 2, the first query is:

<0 president lincoln>

The IR system receives this Boolean query and searches for documents that match. Depending on the number of hits, new Boolean queries may be generated with the purposes of:

1. Refining the ranking of the documents.
2. Reducing the number of hits (narrowing).
3. Increasing the number of hits (broadening).

5.1 Narrowing

Narrowing is performed to attempt to reduce the number of hits. It can also serve to refine the ranking of the documents. One way that MURAX accomplishes narrowing is by constructing and executing new queries that use title phrases rather than noun phrases or that include additional search terms such as main verbs. Including the main verb in the query for Example 2 gives:

[<0 president lincoln> shot]

Another way that MURAX achieves narrowing is by reducing the co-occurrence scope of terms in the query. This constrains phrases to be closer together, and thus indirectly increases the probability of the phrases' being in some syntactic relation with each other. A sequence of queries of increasingly narrow scope is made, the sequence being carried out until the number of hits falls below some predetermined threshold. A narrowed version of the main verb query for Example 2 is shown below:

(10<0 president lincoln> shot)

5.2 Broadening

Broadening is performed to attempt to increase the number of hits. It is achieved in three ways in MURAX:

1. By increasing the co-occurrence scope of words within phrases, while at the same time dropping the requirement for strict ordering of the words. In Example 2, for instance, the broadened query (5 President Lincoln) would match the phrase "President Abraham Lincoln" whereas the first query <0 President Lincoln> would not. MURAX performs a sequence of queries of increasingly broad scope. The sequence continues until some threshold on either the proximity or the resulting number of hits is reached.
2. By dropping one or more whole phrases from the Boolean query. Query terms, each corresponding to a phrase, are dropped to get more hits. It is efficient to drop them in an order that corresponds to decreasing number of overall occurrences in the encyclopedia.
3. By dropping one or more words from within multiple-word phrases in a query to produce a query that is composed of sub-phrases of the original. To increase the number of hits in Example 2, president could be dropped, and so might Lincoln.

5.3 Control Strategy

An initial Boolean query that comprises all the noun phrases derived from the user's question is first constructed and executed. Broadening and narrowing are then performed. The following partial order can be used:

1. Co-occurrence scope is increased before terms are dropped.
2. Individual phrases are dropped from a query before two phrases are dropped.
3. Higher frequency phrases are dropped before lower frequency ones.
4. Title phrases are tried before any of their component noun phrases.
5. Complete phrases are used before their subphrases.

The iterative process of broadening and narrowing terminates when either a threshold on the number of hits has been reached, or no further useful queries can be made. Upon termination th hits are ranked. In practice it is not necessary to provide elaborate ranking criteria and documents are ranked simply by the number of terms they have in common with the user's question.

6. Answer Extraction

This section describes in further detail how MURAX performs answer extraction in accordance with the method of the co-pending application entitled METHOD FOR EXTRACTING FROM A TEXT CORPUS ANSWERS TO QUESTIONS STATED IN NATURAL LANGUAGE BY USING LINGUISTIC ANALYSIS AND HYPOTHESIS GENERATION as incorporated hereinabove by reference. MURAX finds the most likely answer hypotheses from the relevant sentences in the various hits found during the primary query construction phase. Phrase matching operations are conducted first, followed by a procedure for constructing secondary queries to get secondary documents. Generally, several hypotheses can represent the same answer, so they must be linked together and their various phrase matches combined. The hypotheses are then ranked in order of likelihood.

6.1 Phrase Matching

Phrase matching is done with lexico-syntactic patterns which are described using regular expressions. The expressions are translated into finite-state recognizers, which are determinized and minimized (Hopcroft and Ullman, supra) so that matching is done efficiently and without backtracking. Recognizers are applied to match sentences in primary and secondary documents, and the longest possible phrase match is recorded.

An example pattern and text match is shown in Table 9. For convenience, copies of expressions can be included by naming them in other expressions. In Table 9, the expression NP1 refers to a noun phrase whose pattern is defined elsewhere.

TABLE 9

Example Pattern and Text Match

Regular Expression Operators:

| | |
|---|---|
| + | One or more instances |
| ? | Zero or one instances |
| {...} | sequence of instances |
| (...) | inclusive-or of instances |

Lexico-Syntactic pattern:

| | |
|---|---|
| { | NP1 (are were include { such as }) |
| + | {NP2, } |
| ? | NP3 ? {and NP4 }} |

Example match:

"Countries such as Egypt, Sudan, and Israel..."
  NP1              NP2   NP2        NP4

For robustness, MURAX layers phrase matching on top of co-occurrence matching. Accordingly, if the input is not a question (or is a question beginning with "how" or "why"), MURAX provides output that is typical of co-occurrence based search methods.

MURAX's large corpus mitigates some of the problems inherent in using simple language modelling. For example, in a document match, a relation may not be verified because such verification requires more sophisticated analysis than is feasible with a simple finite-state grammar. However, the relation may be expressed in several places in the encyclopedia and thus more simply in some places, which improves the chances that it can be verified. As another example, simple phrase matching can lead to spurious matches. Other things being equal, an answer hypothesis having more instances of a match is preferred. However, it is less likely that spurious matches for an answer hypothesis will occur for several different phrase relations that appear in different places in the encyclopedia. Thus the large corpus tends to prevent spurious-match errors from propagate far enough to cause an erroneous answer.

6.1.1 Verifying in Type Phrases

The following relations are used by MURAX to try to verify answer hypotheses as instances of type phrases:

Apposition.

This is exemplified by the match between the type phrase of the following question and the match sentence below it:

"Who was the last Anglo-Saxon king of England?"

1) "The last Anglo-Saxon king of England, Harold, b.c. 1022, was defeated and killed at . . . "

The IS-A Relation.

This is demonstrated by the following match sentence:

2) "Saint Edward the Confessor, b. between 1002 and 1005, d. Jan. 5, 1066, was the next to last Anglo-Saxon king of England (1042–66)."

List Inclusion.

Lists are often used to enumerate objects of the same type. Examples are seen in Tables 8 and 9.

Noun Phrase Inclusion.

Type phrases are often related to answer hypotheses by being included in them. In the question and corresponding match sentence shown below, the type phrase river is in the same noun phrase as the answer hypothesis Colorado River:

"What river does the Hoover Dam dam?"

". . . the Hoover Dam, on the Colorado River . . . "

6.1.2 Predicate/Argument Match

This operation associates answer hypotheses and other noun phrases in a match sentence that satisfy a verb relation implied in a question. Verbs are simply assumed to be monotransitive and patterns accounting for active and passive alternation are applied. This is illustrated by the question and match sentence shown below:

"Who succeeded Shastri as prime minister?"

". . . Shastri was succeeded by Indira Gandhi as Indian prime minister . . . "

6.1.3 Minimum Mismatch

For reliable identification, simple noun phrases are extracted from match sentences of primary documents. For the question in Table 7, the phrase "mayor of New York City" is first considered as two simpler and independent noun phrases. Exact matching of the overall noun phrase is done after all match sentences are found.

When comparing type phrases with answer hypotheses, the minimum degree of mismatch is considered best. This is illustrated by considering the first question in section 6.1.1 above and the associated match sentences (1) and (2). Both answer hypotheses, "Harold" and "Saint Edward the Confessor," match equally well with the type phrase "last Anglo-Saxon king of England". However, "Harold" is (correctly) preferred because the match is exact, whereas a longer match is involved for "Saint Edward the Confessor" (namely, he was the "next to last Anglo-Saxon king of England").

6.1.4 Person Verification

Confirming an answer hypothesis as a person's name is important. In the encyclopedia, a reliable property of peoples' names is that they have word-initial capital letters. This simple consideration significantly reduces the number of answer hypotheses that require further consideration.

Many different multi-national names are present in the encyclopedia, and exhaustive manual enumeration is impractical. However, there are indirect clues that can be used to verify that an answer hypothesis is a name. Encyclopedia articles about a person generally have the person's name as the title and typically mention birth and/or death dates, which can easily be identified, at the beginning of the article. Usually in such articles there is also a higher percentage of words that are male or female pronouns than in other articles.

Accordingly, to try to confirm an answer hypothesis as a person's name, MURAX makes a secondary query to see if the answer hypothesis is present as an article title, and then decides whether the article is about a person. This heuristic is simple yet robust.

6.2 Secondary Queries

Match sentences in secondary documents are a supplementary means of confirming phrase relations. Secondary documents are found via secondary queries that are constructed by MURAX and passed to the IR system. Broadening is applied as necessary to secondary queries, but terms are never dropped because they are required in the resulting matches. For person verification, the secondary query contains only the answer hypothesis. However, verification of other relations requires other question phrases to be included in the secondary query, as will now be described more fully. In all these secondary queries, answer hypotheses are included verbatim.

6.2.1 Type Phrase Queries

When trying to verify a type phrase, MURAX includes only the head word of the type phrase in the secondary query. This provides the minimal necessary constraint on document matches. The detailed matching of all words in the type phrase is done by considering the degree of mismatch with the type phrase (as in section 6.1.3 above).

When the type phrase cannot be matched against an answer hypothesis using any lexico-syntactic pattern, the fact of their co-occurrence in a sentence is still recorded, as it may serve as a means of ranking alternative hypotheses in the absence of any better information (the relation can still be implied by the document match even if it cannot be inferred from the simple matching operations that MURAX uses for verification).

6.2.2 Co-Occurrence Queries

It is expedient to include other question phrases in secondary queries. As mentioned above in section 4.2, a relevant phrase match can be missed because the primary document in which it occurs has too low a score in comparison to other primary documents. Creating secondary queries with individual question phrases allows the relevant phrase match to be found by bringing documents excluded during primary query construction back into consideration.

Secondary queries are also used to find co-occurrences of answer hypotheses and question phrases that extend beyond the context of a single sentence. This can be useful for ranking alternative answer hypotheses in the absence of other differentiating phrase matches. It is illustrated in the following question and primary document match sentences:

"What film pits Humphrey Bogart against gangsters in the Florida Keys?"

"... Bacall and Bogart became a famous romantic couple in films such as The Big Sleep (1946) and Key Large (1948)."

"Some of his most popular films were The Maltese Falcon (1941); Casablanca (1942), with Ingrid Bergman; The Big Sleep (1946) costarring his wife, Lauren Bacall; The Treasure of Sierra Madre (1948); ..."

Secondary co-occurrence queries determine that the answer hypothesis Key Largo co-occurs with Florida Keys, but the other "film" hypotheses do not; thus in the absence of stronger evidence to the contrary, Key Largo receives a preference.

6.3 Equivalent Hypotheses

Answer hypotheses are identified by the article and match sentence in which they occur. Generally, the same answer is expressed by several hypotheses. This can happen, for example, when an answer hypothesis refers to a person, because often different word sequences are used to refer to the same person. For example, President Kennedy, John F. Kennedy, President John F. Kennedy all refer to the same person. In certain articles of the encyclopedia, so does Kennedy; the usage can be disambiguated in such articles by reference to the articles' titles. In the document titled Kennedy, John F., mention of Kennedy refers to the title, whereas other members of the family are named explicitly (e.g., Joseph P. Kennedy) so as not to confuse the reader.

After forming answer hypotheses, MURAX links together any equivalent answer hypotheses, and then rescores all hypotheses. The most general answer hypothesis in an equivalence class (usually the one that serves as a title) is assigned the cumulative score of all the members and used as the representative of the set. When a document title can be used as the representative, it usually provides the best description for the user. For example, for sentence (1) in section 6.1.1, "Harold" is a correct hypothesis, which is better represented by the more definitive title "Harold II."

Like surnames, the pronouns he and she often refer to the article's title (if the title is a person's name) or to an immediately preceding name. For the example output shown in Table 8, in the document displayed for Norman Mailer, the same answer hypothesis Mailer is used in both sentences; however, if he had been referred to instead as he, the result would be the same.

To verify whether an answer hypothesis refers to a person's name, MURAX first examines primary documents. If this attempt at verification fails, MURAX runs a secondary query. If a title in the resulting matches is equivalent to the hypothesis and the title can be verified as a person's name, then the hypothesis is linked to the title.

6.4 Combining Phrase Matches

MURAX uses the various phrase matching procedures in concert to provide a ranked list of answer hypotheses. It does this by providing several intermediate layers of scoring and preference criteria. A list of criteria for partially ordering hypotheses is given below, in order of precedence. Typically, not all of these criteria apply for a given question; however, the lowest level criterion (criterion 5) always applies, and usually several others do as well.

1. For an input question that includes a type phrase, the highest ranking answer hypotheses are those with minimum mismatch to the type phrase.

2. Answer hypotheses are ranked according to the number of question phrases with which they co-occur. This is qualified by the number of different articles needed to match the most question phrases.

3. Predicate/argument matches are used to produce preferences among different answer hypotheses.

4. For who questions, an answer hypothesis that is verified as a person takes precedence.

5. Answer hypotheses are ranked in terms of their co-occurrence with question phrases.

7. Performance Evaluation

This section presents an evaluation of MURAX's performance for questions beginning with "who" and "what" that have simple noun phrase answers. (Questions having conjoined noun phrases such as "Richard Nixon and Nikita Khrushchev" are not included.)

Seventy questions taken from the game "Trivial Pursuit," each of which was known to have a simple noun phrase answer, were used for the evaluation. Additionally, it was confirmed that the answers to these questions were present in the encyclopedia—that is, given a question and its answer, a person could find text in the encyclopedia from which the answer could be inferred using common sense.

The evaluation was based on an objective, system-dependent criterion: the rank of the correct answer hypothesis. The results are shown in Table 10 below.

TABLE 10

MURAX Evaluation Results

| Rank of Correct Hypothesis | Number of Questions |
| --- | --- |
| Top | 37 |
| Top 3 | 49 |
| Top 5 | 52 |
| Not in Top 5 | 18 |

Table 10 indicates that MURAX's best guess is the correct answer for 53 percent of the questions (37 out of 70) and that the correct answer lies in MURAX's top five guesses for 74 percent of the questions. Using a cutoff of five guesses, answers are thus considered to be found for 74 percent of the questions and the mean rank of the correct hypothesis is 1.44.

The examples given in Table 5 above are typical of the questions that were used for the evaluation. Correct answers were in the top five hypotheses for all these questions of except question 10. For question 10, the answer "forget-me-not" was not found because MURAX does not consider references involving impersonal pronouns. Such a reference is necessary to infer the answer from the sentence "It is the state flower of Alaska."

Part IV. Conclusion

The present invention provides a method for retrieving documents from a text corpus in response to a user-supplied natural language input string. The method includes input string analysis, for example by a text tagger, to detect phrases; automatic construction and reformulation of queries based on detected phrases and using systematic broadening and narrowing techniques; and results ranking, typically according to relevance criteria. The method uses broadening and narrowing techniques in a coordinated, systematic fashion and in conjunction with noun-phrase and title-phrase recognition. The method can be used either by itself or in the context of other, larger methods. In particular it can be used in conjunction with answer extraction in a two-phase IR method such as that embodied in MURAX.

Although the above is a complete description of certain embodiments and aspects of the invention, various alternatives, modifications, and equivalents can be used. For example, in the context of the MURAX system—which itself is but one of many possible embodiments of the method of the invention—enhancements can be made to improve performance within the scope of the present invention. One such addition is the incorporation of synonym and hyponym information. In particular the WordNet thesaurus (G. A. Miller, R. Beckwith, C. Fellbaum, D. Gross, and K. Miller, "Five papers on WordNet," technical report, Princeton University Computer Science Laboratory, July 1990) appears well-suited to the MURAX task and could provide the system with useful synonym and hyponym information. For example, consider the question "What Pulitzer Prize-winning novelist ran for mayor of New York City?" WordNet indicates that novelist is a hyponym of writer, author and also person. This means that the answer to the question is likely to be a person's name even though the question starts with "what". Furthermore, any type phrase matches involving the words writer or author are also relevant.

Another contemplated addition to MURAX, again within the scope of the invention, involves using alternate grammar formalisms for linguistic analysis. The linguistic analysis in the version of MURAX described above is based on an underlying regular grammar formalism, both in the HMM tagger and the phrase recognizers. There can be benefits from the use of stochastic context-free grammars, which can also be trained from unlabelled text (see J. M. Kupiec, "Hidden Markov estimation for unrestricted stochastic context-free grammars," in *Proceedings of the 1992 International Conference on Acoustics, Speech and Signal Processing*, pages I-177–180, IEEE Signal Processing Society, IEEE, March 1992) and enable ambiguity to be quantified in probabilistic terms.

These additions to MURAX in no way exhaust the possibilities for extending MURAX within the scope of the present invention. For example, MURAX could be extended to include a comprehensive evaluation phase that takes account of not only the rank of correct hypotheses, but also the suitability of the match sentences that are presented to the user to verify phrase relations. Inasmuch as numerous extensions to MURAX are possible, and inasmuch as MURAX and its extensions represent only a small subset of the possible embodiments of the invention, the above description should not be taken as limiting the invention's scope. Rather, the scope of the invention is defined by the appended claims along with the full scope of equivalents to which such claims are entitled.

What is claimed is:

1. In a system comprising a processor, a memory coupled to the processor, a user interface coupled to the processor, a primary query construction subsystem executed by the processor, a computerized information retrieval (IR) subsystem coupled to a text corpus, and a channel coupling the primary query construction subsystem and the information retrieval subsystem with one another, a method for retrieving documents from the text corpus in response to a user-supplied natural language input string comprising words, the method comprising the steps of:

with the user interface, accepting the input string into the primary query construction subsystem;

with the primary query construction subsystem, analyzing the input string by performing a linguistic analysis of the input string to detect phrases therein, the detected phrases comprising words, each of the detected phrases comprising a grammatical construct identified in the linguistic analysis, at least one of the grammatical constructs identified in the linguistic analysis being a noun phrase comprising a plurality of words including a head word;

with the primary query construction subsystem, constructing a series of queries based on the detected phrases, the queries of the series being constructed automatically by the primary query construction subsystem through a sequence of operations that comprises successive query broadening and query narrowing operations, each constructed query of the series comprising a collection of component queries, each component query being formed from a single one of the grammatical constructs identified in the linguistic analysis, each constructed query of the series having a first proximity constraint and a second proximity constraint, the first proximity constraint pertaining to a proximity relationship among words within a component query, the second proximity constraint pertaining to a proximity relationship among at least two component queries, at least one of the queries of the series comprising a component query based on all the words of the plurality:

with the primary query construction subsystem, automatically constructing an additional query based on the head word of the noun phrase without the other words of the plurality;

with the primary query construction subsystem, the information retrieval subsystem, the text corpus, and the channel, executing the queries of the series and the additional query to retrieve documents from the text corpus, the queries of the series being executed before the additional query; and with the primary query construction subsystem, ranking documents retrieved from the text corpus in response to one or more queries thus executed.

2. The method of claim 1 in which the input string is selected from the group of a question, a sentence, a paragraph, an article, or a document.

3. The method of claim 1 in which the step of analyzing the input string comprises a part-of-speech analysis applied to the input string.

4. The method of claim 3 in which the step of analyzing the input string comprises case-splitting.

5. The method of claim 1 in which the query broadening and query narrowing operations are interleaved.

6. The method of claim 1 in which queries of the series are Boolean queries.

7. The method of claim 1 in which queries of the series include constraints selected from the group consisting of proximity constraints and order constraints.

8. The method of claim 7 in which the query broadening and query narrowing operations are interleaved.

9. The method of claim 1 in which at least one of the query broadening operations comprises a relaxation of the first proximity constraint.

10. The method of claim 1 in which at least one of the query narrowing operations comprises a tightening of the second proximity constraint.

11. The method of claim 1 in which the step of constructing queries comprises determining one or more additional words, each additional word being related to a word of the input string, and constructing one or more queries based on the related words thus determined.

12. The method of claim 11 in which the additional words are related to the input strings by a relationship selected from the group consisting of synonyms and hyponyms.

13. The method of claim 1 in which the step of ranking documents retrieved from the text corpus comprises ordering the documents according to one or more criteria.

14. The method of claim 13 wherein the analyzing step includes determining a linguistic characteristic of a phrase in the input string, and in which a criterion of the one or more of the criteria is based on the determined linguistic characteristic.

15. The method of claim 1 in which the step of ranking the documents comprises constructing a list of ranked documents.

16. The method of claim 15 further comprising the step of modifying with the primary query construction subsystem the list of ranked documents thus constructed.

17. The method of claim 16 in which the step of modifying the list of ranked documents comprises highlighting search terms within the ranked documents of the list.

18. The method of claim 1 in which the step of ranking the documents comprises constructing a list of ranked document identifiers.

19. The method of claim 1 further comprising the step of outputting the documents thus ranked.

20. The method of claim 19 in which the step of outputting the documents thus ranked comprises:

with the user interface, presenting the ranked documents to the user.

21. The method of claim 19 in which the system further comprises a storage device coupled to the processor and in which the step of outputting the documents thus ranked comprises storing with the storage device the documents thus ranked.

22. The method of claim 19 in which the step of outputting the documents thus ranked comprises making the documents thus ranked available for further processing.

23. The method of claim 1 wherein each grammatical construct identified in the linguistic analysis is selected from the group consisting of a noun phrase, a verb phrase, and a title phrase.

24. In a system comprising a processor, a memory coupled to the processor, a user interface coupled to the processor, a storage device coupled to the processor, a primary query construction subsystem executed by the processor, a computerized information retrieval (IR) subsystem coupled to a text corpus, and a channel connecting the primary query construction subsystem and the information retrieval subsystem with one another, a method for retrieving documents from the text corpus in response to a user-supplied natural language question comprising words, the method comprising the steps of:

with the user interface, accepting the question into the primary query construction subsystem;

with the primary query construction subsystem, detecting phrases in the question using a text tagger, each of the detected phrases being a grammatical construct selected from the group a noun phrase, a title phrase, or a verb phrase, at least one of the detected phrases being a noun phrase comprising a plurality of words including a head word;

with the primary query construction subsystem, constructing a set of initial queries based on one or more detected noun phrases, at least one of the initial queries including all the words of the plurality;

with the primary query construction subsystem, the information retrieval subsystem, the text corpus, and the channel, processing the initial queries to obtain a number of matches for each initial query and to record the number of matches in a frequency table;

with the primary query construction subsystem, constructing a set of title phrase queries based on any title phrases detected in the question;

with the primary query construction subsystem, constructing component queries based on information in the frequency table;

with the primary query construction subsystem, constructing additional component queries based on the set of title phrase queries;

with the primary query construction subsystem, constructing a series of compound queries each comprising two or more component queries, each component query being formed from a single one of the grammatical constructs, the queries of the series being constructed automatically by the primary query construction subsystem with minimal user intervention through a sequence of operations, wherein:

at least one compound query of the series is a broadened version of a particular compound query of the series, the broadened version being constructed by broadening the particular compound query through relaxation of at least one proximity constraint pertaining to a proximity relationship within at least one component query of the particular compound query; and at least one compound query of the series is a narrowed version of the broadened version, the narrowed version being constructed by tightening a proximity constraint pertaining to a proximity relationship among at least two of the component queries of the broadened version;

with the primary query construction subsystem, constructing an additional query formed from the head word of the noun phrase without the other words of the plurality;

with the primary query construction subsystem, the information retrieval subsystem, the text corpus, and the channel, processing the series of compound queries and the additional query in order to retrieve a plurality of documents from the text corpus, the queries of the series being processed before the additional query; and with the primary query construction subsystem, ranking documents retrieved from the text corpus in response to one or more queries thus processed; and with the primary query construction subsystem, outputting the documents thus ranked.

25. The method of claim 24 in which the question is a closed-class question.

\* \* \* \* \*